(12) United States Patent
Kuwahara et al.

(10) Patent No.: US 10,690,514 B2
(45) Date of Patent: Jun. 23, 2020

(54) ROTATION ANGLE DETECTION DEVICE AND ROTATION ANGLE DETECTION METHOD

(71) Applicant: NSK LTD., Tokyo (JP)

(72) Inventors: Masaki Kuwahara, Kanagawa (JP); Kazuhiro Ohira, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/605,900

(22) PCT Filed: Apr. 11, 2018

(86) PCT No.: PCT/JP2018/015299
§ 371 (c)(1),
(2) Date: Oct. 17, 2019

(87) PCT Pub. No.: WO2018/198779
PCT Pub. Date: Nov. 1, 2018

(65) Prior Publication Data
US 2020/0041308 A1 Feb. 6, 2020

(30) Foreign Application Priority Data
Apr. 25, 2017 (JP) ................... 2017-086378

(51) Int. Cl.
*G01D 5/14* (2006.01)
*G01D 5/244* (2006.01)
*G01B 7/30* (2006.01)

(52) U.S. Cl.
CPC ........ *G01D 5/14* (2013.01); *G01B 7/30* (2013.01)

(58) Field of Classification Search
CPC ............. G01D 5/14; G01D 5/244; G01B 7/30
See application file for complete search history.

(56) References Cited

U.S. PATENT DOCUMENTS 5,239,490 A * 8/1993 Masaki .............. G01B 7/30
702/41
5,677,686 A 10/1997 Kachi et al.
(Continued)

FOREIGN PATENT DOCUMENTS

JP 7-218288 A 8/1995
JP 5671255 B2 2/2015

OTHER PUBLICATIONS

International Search Report dated Jul. 3, 2018 issued by the International Searching Authority in counterpart International Application No. PCT/JP2018/015299 (PCT/ISA/210).
(Continued)

*Primary Examiner* — Toan M Le
(74) *Attorney, Agent, or Firm* — Sughrue Mion, PLLC

(57) ABSTRACT

A rotation angle detection device includes: a rotating body having magnetic tracks on which magnetic pole pairs are arranged at even intervals in concentric ring shapes; magnetic sensors each configured to detect a magnetic field of a corresponding one of the magnetic tracks and output a sine signal and a cosine signal; storage configured to store magnetic sensor correction information; a correction calculator configured to correct the sine signal and the cosine signal based on the magnetic sensor correction information; a phase detector configured to calculate a phase of the corrected sine signal and the corrected cosine signal; a phase difference detector configured to calculate a phase difference between a plurality of the phases; and an angle calculator configured to convert the phase difference into an absolute angle.

8 Claims, 24 Drawing Sheets

(56) References Cited

U.S. PATENT DOCUMENTS

| | | | |
|---|---|---|---|
| 7,301,333 B2* | 11/2007 | Kuwahara | H02K 29/12 324/207.25 |
| 7,472,004 B2* | 12/2008 | Hara | B62D 5/0409 180/443 |
| 2012/0105055 A1 | 5/2012 | Takahashi et al. | |

OTHER PUBLICATIONS

Written Opinion dated Jul. 3, 2018 issued by the International Searching Authority in counterpart International Application No. PCT/JP2018/015299 (PCT/ISA/237).

* cited by examiner

US 10,690,514 B2

ROTATION ANGLE DETECTION DEVICE AND ROTATION ANGLE DETECTION METHOD

This application is a National Stage of PCT international application Ser. No. PCT/JP2018/015299 filed on Apr. 11, 2018 which designates the United States, incorporated herein by reference, and which is based upon and claims the benefit of priority from Japanese Patent Application No. 2017-086378 filed on Apr. 25, 2017, the entire contents of which are incorporated herein by reference.

FIELD

The present invention relates to a rotation angle detection device and a rotation angle detection method.

BACKGROUND

Rotation angle detection devices for detecting a relative angle or an absolute angle of a rotation angle detection target are used in automotive drive motors for, for example, electric power steering devices. It is also conceivable to apply the rotation angle detection devices to bearings used in various devices required to be rotationally controlled. For example, Patent Literature 1 describes a rotation angle detection device-equipped bearing integrally incorporating a rotation angle detection device. The rotation angle detection device described in Patent Literature 1 includes a rotating body provided with a plurality of magnetic tracks provided with mutually different numbers of magnetic poles arranged at even intervals in a concentric ring configuration and a plurality of magnetic sensors for detecting respective magnetic fields of these magnetic tracks, and the rotating body is mounted on a rotary shaft of a rotor of an automotive drive motor or on a member that rotates integrally with the rotary shaft. The rotation angle detection device detects a rotor angle of the automotive drive motor. With this configuration, the rotation angle detection device can be compactly incorporated without increasing the axial dimension of the automotive drive motor.

CITATION LIST

Patent Literature

Patent Literature 1: Japanese Patent No. 5671255

SUMMARY

Technical Problem

To control the automotive drive motors for, for example, the electric power steering devices, accurate rotor angle information is required. However, detection values are considered to include errors caused by, for example, errors in physical positions of the magnetic sensors or eccentricity of the rotating body.

The present invention has been made in view of the above-described problem, and it is an object thereof to provide a rotation angle detection device and a rotation angle detection method capable of accurately detecting a rotation angle.

Solution to Problem

To achieve the above object, an aspect of the present invention provides a rotation angle detection device that includes: a rotating body having a plurality of magnetic tracks on which magnetic pole pairs each including a north pole and a south pole are arranged at even intervals in concentric ring shapes, the magnetic tracks being different from each other in number of the magnetic pole pairs arranged thereon; a plurality of magnetic sensors each configured to detect a magnetic field of a corresponding one of the magnetic tracks and output a sine signal and a cosine signal; storage configured to store magnetic sensor correction information that is preset such that a value of the sine signal output by each of the magnetic sensors corresponding to a rotation angle of the rotating body comes closer to a value of a reference sine signal of the magnetic sensor, or such that a value of the cosine signal output by the magnetic sensor corresponding to the rotation angle of the rotating body comes closer to a value of a reference cosine signal of the magnetic sensor; a correction calculator configured to correct the sine signal and the cosine signal to a corrected sine signal and a corrected cosine signal based on the magnetic sensor correction information; a phase detector configured to calculate a phase of the corrected sine signal and the corrected cosine signal; a phase difference detector configured to calculate a phase difference between a plurality of the phases; and an angle calculator configured to convert the phase difference into an absolute angle.

With this configuration, the rotation angle detection device can correct in real time the sine signal and the cosine signal before the detected phases of the magnetic sensors are calculated by the phase detector. The phases are calculated using the corrected sine signal and the corrected cosine signal that have been corrected from the sine signal and the cosine signal based on the known preset magnetic sensor correction information. Therefore, the detection accuracy of the absolute angle of the rotating body is improved. Accordingly, the rotation angle detection device can accurately detect the absolute angle of the rotating body.

As a preferable aspect of the rotation angle detection device, the magnetic tracks preferably include a first magnetic track having the number of the magnetic pole pairs of P (where P is a natural number) and a second magnetic track having the number of the magnetic pole pairs of P−1 or P+1.

With this configuration, the absolute angle in the entire circumference of the rotating body can be detected.

As a preferable aspect of the rotation angle detection device, when the number of the magnetic pole pairs on the first magnetic track is n×Q (where n and Q are positive natural numbers), the magnetic tracks preferably further include a third magnetic track having the number of the magnetic pole pairs of n×(Q−1) or n×(Q+1).

With this configuration, the absolute angle can be detected in each segment obtained by dividing the entire circumference of the rotating body into n equal parts, and the reliability in the detection of the absolute angle of the rotating body can be increased.

As a preferable aspect of the rotation angle detection device, it is preferred that V sin ave denotes an average value of the sine signal; V cos ave denotes an average value of the cosine signal; $\sin \theta_i$ and $\cos \theta_i$ denote input signal values; $\sin \theta'$ and $\cos \theta'$ denote output signal values; and the value V sin ave and the value V cos ave are stored as the magnetic sensor correction information in the storage, and the correction calculator is configured to use Expression (1) below to calculate the value $\sin \theta'$ and use Expression (2) below to calculate the value $\cos \theta'$.

$$\sin \theta' = \sin \theta_i - V \sin \text{ave} \quad (1)$$

$$\cos \theta' = \cos \theta_i - V \cos \text{ave} \quad (2)$$

With this configuration, offset voltages of the sine signal and the cosine signal are normalized. Therefore, the detection accuracy of the absolute angle of the rotating body is improved.

As a preferable aspect of the rotation angle detection device, it is preferred that V sin max denotes a maximum value of the sine signal; V sin min denotes a minimum value of the sine signal; V cos max denotes a maximum value of the cosine signal; V cos min denotes a minimum value of the cosine signal; $\sin \theta_i$ and $\cos \theta_i$ denote input signal values; $\sin \theta'$ and $\cos \theta'$ denote output signal values; and the value V sin max, the value V sin min, the value V cos max, and the value V cos min are stored as the magnetic sensor correction information in the storage, and the correction calculator is configured to use Expression (3) below to calculate the value $\sin \theta'$ and use Expression (4) below to calculate the value $\cos \theta'$.

$$\sin \theta' = \sin \theta_i / (|V \sin \max - V \sin \min|/2) \tag{3}$$

$$\cos \theta' = \cos \theta_i / (|V \cos \max - V \cos \min|/2) \tag{4}$$

With this configuration, amplitude values of the sine signal and the cosine signal are normalized. Therefore, the detection accuracy of the absolute angle of the rotating body is improved.

As a preferable aspect of the rotation angle detection device, it is preferred that V sin ave denotes an average value of the sine signal; V cos ave denotes an average value of the cosine signal; V sin max denotes a maximum value of the sine signal; V sin min denotes a minimum value of the sine signal; V cos max denotes a maximum value of the cosine signal; V cos min denotes a minimum value of the cosine signal; $\sin \theta_i$ and $\cos \theta_i$ denote input signal values; $\sin \theta'$ and $\cos \theta'$ denote output signal values; and the value V sin ave, the value V cos ave, the value V sin max, the value V sin min, the value V cos max, and the value V cos min are stored as the magnetic sensor correction information in the storage, and the correction calculator is configured to use Expressions (5) and (7) below to calculate the value $\sin \theta'$ and use Expressions (6) and (8) below to calculate the value $\cos \theta'$.

$$\sin \theta'' = \sin \theta_i - V \sin \text{ave} \tag{5}$$

$$\cos \theta'' = \cos \theta_i - V \cos \text{ave} \tag{6}$$

$$\sin \theta' \sin \theta'' / (|V \sin \max - V \sin \min|/2) \tag{7}$$

$$\cos \theta' = \cos \theta'' / (|V \cos \max - V \cos \min|/2) \tag{8}$$

With this configuration, both the offset voltages and the amplitude values of the sine signal and the cosine signal are normalized. Therefore, the detection accuracy of the absolute angle of the rotating body is improved.

As a preferable aspect of the rotation angle detection device, it is preferred that $\theta_{ic}$ denotes a sensor phase error between an output phase of the sine signal and an output phase of the cosine signal; $\sin \theta'$ and $\cos (\theta'+\theta_{ic})$ denote input signal values; $\sin \theta_o$ and $\cos \theta_o$ denote output signal values; and the error $\theta_{ic}$ is stored as the magnetic sensor correction information in the storage, and the correction calculator is configured to use Expression (9) below to calculate the value $\sin \theta_o$ and use Expression (10) below to calculate the value $\cos \theta_o$.

$$\sin \theta_o = \sin \theta' \tag{9}$$

$$\cos \theta_o = (\cos(\theta'+\theta_{ic}) + \sin \theta' \times \sin \theta_{ic}) / \cos \theta_{ic} \tag{10}$$

A known value measured in advance, for example, at a shipping inspection of the rotation angle detection device can be used as the sensor phase error between the output phase of the sine signal and the output phase of the cosine signal. In addition, the rotation angle detection device can use Expression (10) to easily perform the correction calculation of the phase of the cosine signal using the sine signal as a reference. As a result, the rotation angle detection device can more quickly calculate the absolute angle of the rotating body.

As a preferable aspect of the rotation angle detection device, it is preferred that $\theta_{ic}$ denotes a sensor phase error between an output phase of the sine signal and an output phase of the cosine signal; $\sin (\theta'+\theta_{ic})$ and $\cos \theta'$ denote input signal values; $\sin \theta_o$ and $\cos \theta_o$ denote output signal values; and the error $\theta_{ic}$ is stored as the magnetic sensor correction information in the storage, and the correction calculator is configured to use Expression (11) below to calculate the value $\cos \theta_o$ and use Expression (12) below to calculate the value $\sin \theta_o$.

$$\cos \theta_o = \cos \theta' \tag{11}$$

$$\sin \theta_o = (\sin(\theta'+\theta_{ic}) + \cos \theta' \times \cos \theta_{ic}) / \sin \theta_{ic} \tag{12}$$

A known value measured in advance, for example, at the shipping inspection of the rotation angle detection device can be used as the sensor phase error between the output phase of the sine signal and the output phase of the cosine signal. In addition, the rotation angle detection device can use Expression (12) to easily perform the correction calculation of the phase of the sine signal using the cosine signal as a reference. As a result, the rotation angle detection device can more quickly calculate the absolute angle of the rotating body.

As a preferable aspect of the rotation angle detection device, it is preferred that $\sin \theta'$ and $\cos \theta'$ denote input signal values, and $\sin \theta_o$ and $\cos \theta_o$ denote output signal values, and the correction calculator is configured to use Expression (13) below to calculate the value $\sin \theta_o$ and use Expression (14) below to calculate the value $\cos \theta_o$.

$$\sin \theta_o = \sin \theta' / (1-(1-\sin^2 \theta' + \cos^2 \theta')/2) \tag{13}$$

$$\cos \theta_o = \cos \theta' / (1-(1-\sin^2 \theta' + \cos^2 \theta')/2) \tag{14}$$

The rotation angle detection device can use Expressions (13) and (14) to easily perform the correction calculation to reduce cyclic amplitude variations of the sine signal and the cosine signal. As a result, the rotation angle detection device can more quickly calculate the absolute angle of the rotating body.

As a preferable aspect of the rotation angle detection device, it is preferred that $\theta_{ic}$ denotes a sensor phase error between an output phase of the sine signal and an output phase of the cosine signal; $\sin \theta'$ and $\cos (\theta'+\theta_{ic})$ denote input signal values; $\sin \theta_o$ and $\cos \theta_o$ denote output signal values; and the error $\theta_{ic}$ is stored as the magnetic sensor correction information in the storage, and the correction calculator is configured to use Expressions (15) and (17) below to calculate the value $\sin \theta_o$ and use Expressions (16) and (18) below to calculate the value $\cos \theta_o$.

$$\sin \theta_o' = \sin \theta' \tag{15}$$

$$\cos \theta_o' = (\cos(\theta'+\theta_{ic}) + \sin \theta' \times \sin \theta_{ic})/\cos \theta_{ic} \tag{16}$$

$$\sin \theta_o = \sin \theta_o' / (1-(1-\sin^2 \theta_o' + \cos^2 \theta_o')/2) \tag{17}$$

$$\cos \theta_o = \cos \theta_o' / (1-(1-\sin^2 \theta_o' + \cos^2 \theta_o')/2) \tag{18}$$

With this configuration, Expressions (15), (16), (17), and (18) can be used to easily perform both the correction calculation of the phase of the cosine signal using the sine signal as a reference and the correction calculation to reduce the cyclic amplitude variations of the sine signal and the cosine signal.

As a preferable aspect of the rotation angle detection device, it is preferred that $\theta_{ic}$ denotes a sensor phase error between an output phase of the sine signal and an output phase of the cosine signal; sin ($\theta'+\theta_{ic}$) and cos $\theta'$ denote input signal values; sin $\theta_o$ and cos $\theta_o$ denote output signal values; and the error $\theta_{ic}$ is stored as the magnetic sensor correction information in the storage, and the correction calculator is configured to use Expressions (19) and (21) below to calculate the value sin $\theta_o$ and use Expressions (20) and (22) below to calculate the value cos $\theta_o$.

$$\sin \theta_o' = (\sin(\theta'+\theta_{ic}) + \cos \theta' \times \cos \theta_{ic})/\sin \theta_{ic} \quad (19)$$

$$\cos \theta_o' = \cos \theta' \quad (20)$$

$$\sin \theta_o = \sin \theta_o'/(1-(1-\sin^2 \theta_o' + \cos^2 \theta_o')/2) \quad (21)$$

$$\cos \theta_o = \cos \theta_o'/(1-(1-\sin^2 \theta_o' + \cos^2 \theta_o')/2) \quad (22)$$

With this configuration, Expressions (19), (20), (21), and (22) can be used to easily perform both the correction calculation of the phase of the sine signal using the cosine signal as a reference and the correction calculation to reduce the cyclic amplitude variations of the sine signal and the cosine signal.

As a preferable aspect of the rotation angle detection device, it is preferred that the magnetic tracks are magnetized on one end face in an axial direction of the rotating body.

Such a configuration can thin the rotation angle detection device in the axial direction thereof, and can enlarge a hollow hole thereof. This configuration can expand the scope of application of the rotation angle detection device, including, for example, applications to inner-ring rotating and outer-ring rotating bearings, and applications to structures of devices in which cables are wired through the hollow hole. The configuration can also increase the degree of freedom of designing a device to which the rotation angle detection device is applied. A side surface of the rotating body may be magnetized. In this case, the rotation angle detection device can be made smaller in the radial direction.

As a preferable aspect of the rotation angle detection device, the rotation angle detection device preferably includes an angle information generator for generating absolute angle information including the absolute angle, and is preferably provided with at least one integrated circuit (IC) chip in which two of the magnetic sensors, two of the correction calculators, two of the phase detectors, the phase difference detector, the angle calculator, and the angle information generator are integrated into one chip.

This integration can lead to, for example, a reduction in number of parts constituting the rotation angle detection device, an improvement in positional accuracy between the magnetic sensors, and reductions in manufacturing cost and assembly cost, and can provide the small and low-cost rotation angle detection device.

As a preferable aspect of the rotation angle detection device, the rotation angle detection device preferably includes a transmitter that converts the absolute angle information into an appropriate signal and outputs the result, and the IC chip preferably further includes the transmitter.

This configuration can further reduce the size and cost of the rotation angle detection device.

As a preferable aspect of the rotation angle detection device, the IC chip preferably further includes the storage.

This configuration can further reduce the size and cost of the rotation angle detection device.

As a preferable aspect of the rotation angle detection device, the rotation angle detection device preferably includes a first transmitter that converts the absolute angle information into an appropriate signal and outputs the result, and a second transmitter that converts the appropriate signal into an appropriate protocol, and the IC chip preferably further includes the first transmitter.

This configuration can further reduce the size and cost of the rotation angle detection device.

As a preferable aspect of the rotation angle detection device, the IC chip preferably further includes the storage.

This configuration can further reduce the size and cost of the rotation angle detection device.

As a preferable aspect of the rotation angle detection device, the magnetic tracks preferably includes: a first magnetic track; a second magnetic track provided at an outer circumference of the first magnetic track; and a third magnetic track provided at an inner circumference of the first magnetic track, and the rotation angle detection device preferably further includes: a first magnetic sensor module including the magnetic sensor that is configured to detect the magnetic field of the first magnetic track and the magnetic sensor that is configured to detect the magnetic field of the second magnetic track; and a second magnetic sensor module including the magnetic sensor that is configured to detect the magnetic field of the first magnetic track and the magnetic sensor that is configured to detect the magnetic field of the third magnetic track.

This configuration can improve the accuracy of position detection by the rotation angle detection device, and as a result, can contribute to an improvement in rotation control performance of various devices.

As a preferable aspect of the rotation angle detection device, it is preferred that the first magnetic sensor module and the second magnetic sensor module are arranged so as to be shifted from each other in a circumferential direction of the rotating body.

This configuration can reduce the width in the radial direction of the first magnetic track. This, in turn, can increase the diameter of the hollow hole of the rotating body, and can provide a higher degree of freedom of designing the device to which the rotation angle detection device is applied.

To achieve the above object, an aspect of the present invention provides a rotation angle detection method that includes: a signal correction step of correcting a sine signal and a cosine signal to a corrected sine signal and a corrected cosine signal based on magnetic sensor correction information that is preset such that a value of the sine signal output by each of a plurality of magnetic sensors configured to detect a magnetic field of a corresponding one of a plurality of magnetic tracks and output the sine signal and the cosine signal corresponding to a rotation angle of a rotating body that has the magnetic tracks on which magnetic pole pairs each including a north pole and a south pole are arranged at even intervals in concentric ring shapes, the magnetic tracks being different from each other in number of the magnetic pole pairs arranged thereon, comes closer to a value of a reference sine signal of the magnetic sensor, or such that a value of the cosine signal output by the magnetic sensor corresponding to the rotation angle of the rotating body comes closer to a value of a reference cosine signal of the magnetic sensor; a phase calculation step of calculating a phase of the corrected sine signal and the corrected cosine signal; a phase difference calculation step of calculating a phase difference between a plurality of the phases; and an absolute angle calculation step of converting the phase difference into an absolute angle.

With this configuration, the sine signal and the cosine signal can be corrected in real time before the detected phases of the magnetic sensors are calculated. The phases are calculated using the corrected sine signal and the corrected cosine signal that have been corrected from the sine signal and the cosine signal based on the known preset magnetic sensor correction information. Therefore, the detection accuracy of the absolute angle of the rotating body is improved. Accordingly, the absolute angle of the rotating body can be accurately detected.

Advantageous Effects of Invention

The present invention can provide a rotation angle detection device capable of accurately detecting a rotation angle.

BRIEF DESCRIPTION OF DRAWINGS

FIG. 32 is a flowchart for describing operations of the magnetic sensor module after a power supply is turned on.

DESCRIPTION OF EMBODIMENTS

The following describes modes for carrying out the present invention (hereinafter, referred to as embodiments) in detail with reference to the drawings. The embodiments described below do not limit the present invention. Components in the embodiments described below include those easily conceivable by those skilled in the art, those substantially the same, and those in the range of what are called equivalents. The components disclosed in the embodiments described below can be combined as appropriate.

First Embodiment

Configuration of Rotation Angle Detection Device

Figure 1:
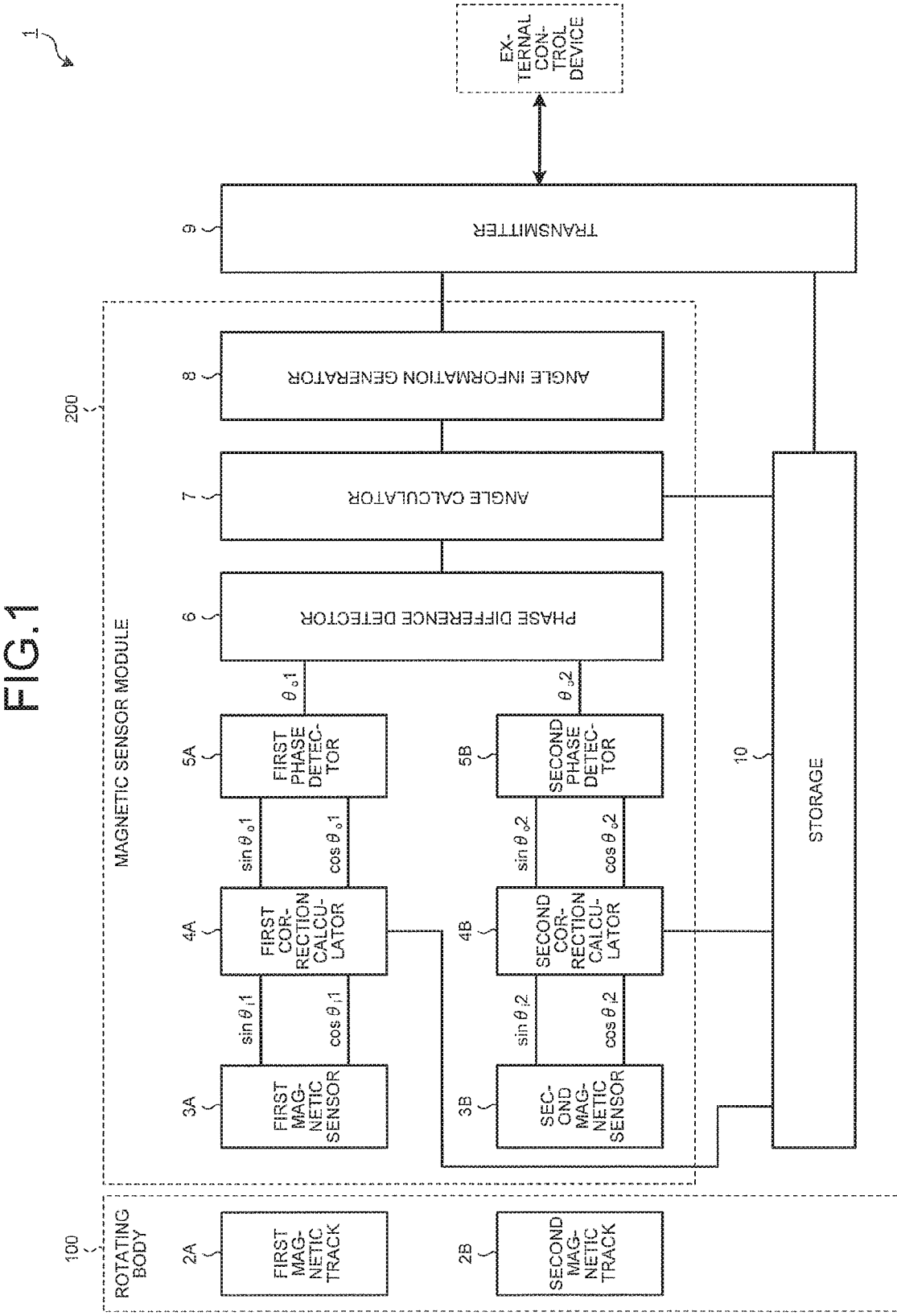
FIG. 1 is a diagram illustrating an example of a rotation angle detection device according to a first embodiment.

FIG. 1 is a diagram illustrating an example of a rotation angle detection device according to a first embodiment. As illustrated in FIG. 1, a rotation angle detection device 1 according to the first embodiment includes a rotating body 100 having a first magnetic track 2A and a second magnetic track 2B, a magnetic sensor module 200, a transmitter 9, and storage 10.

The magnetic sensor module 200 includes a first magnetic sensor 3A, a first correction calculator 4A, a first phase detector 5A, a second magnetic sensor 3B, a second correction calculator 4B, a second phase detector 5B, a phase difference detector 6, an angle calculator 7, and an angle information generator 8.

In the present embodiment, the magnetic sensor module 200 is, for example, integrated into one IC chip. This integration can lead to, for example, a reduction in number of parts constituting the rotation angle detection device 1, an improvement in positional accuracy between the first magnetic sensor 3A and the second magnetic sensor 3B, and reductions in manufacturing cost and assembly cost, and can provide the small and low-cost rotation angle detection device 1. The magnetic sensor module 200 may include, for example, the transmitter 9 and the storage 10. This configuration can further reduce the size and cost of the rotation angle detection device 1.

Figure 2:
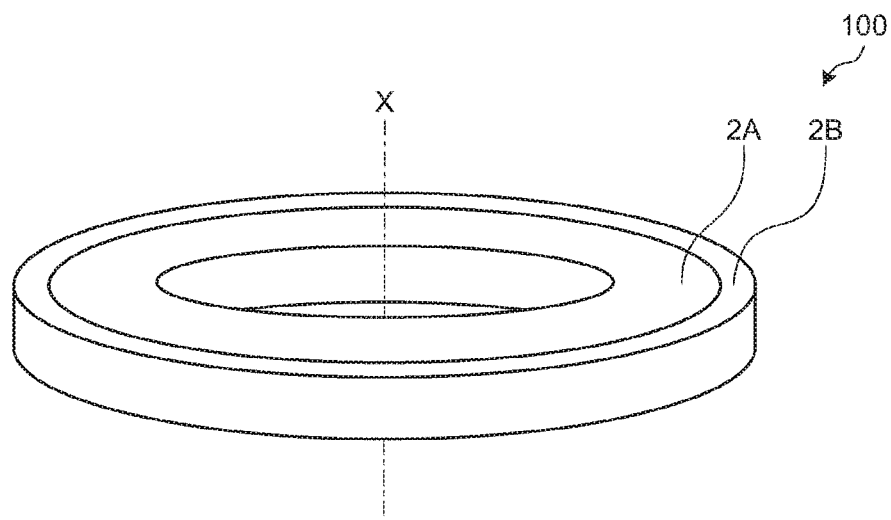
FIG. 2 is a diagram illustrating an example of a rotating body of the rotation angle detection device according to the first embodiment.
Figure 3:
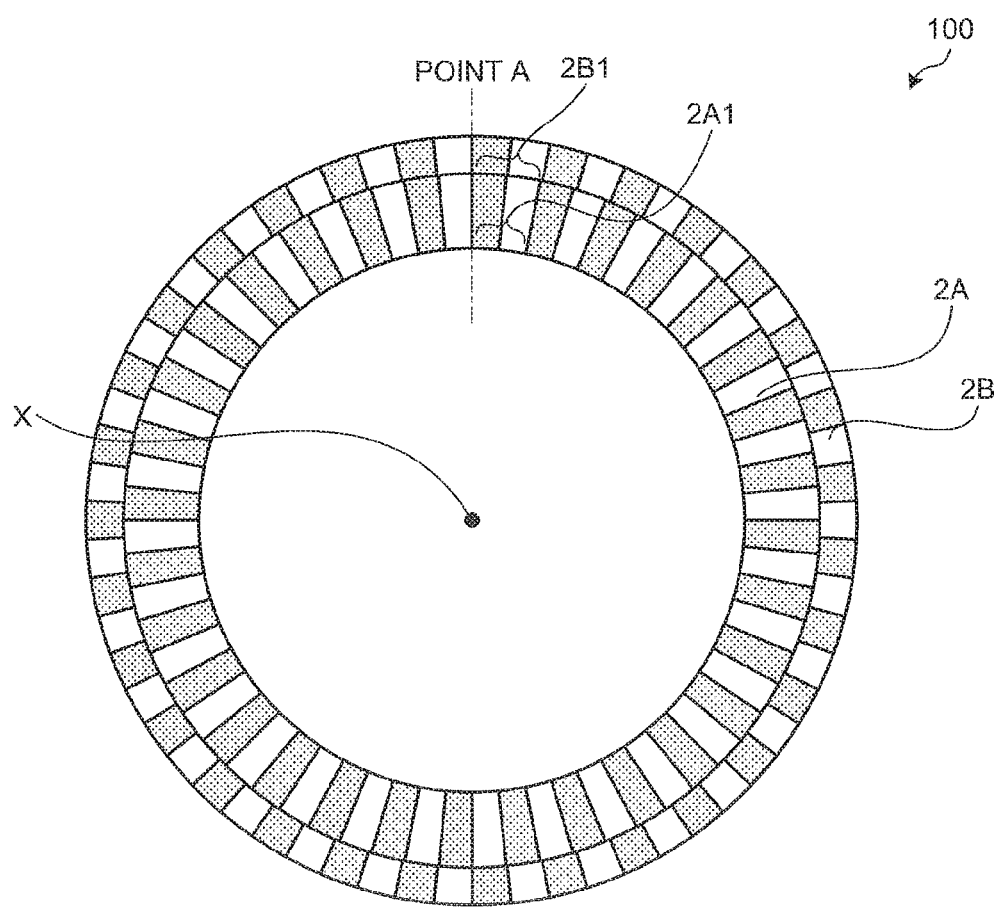
FIG. 3 is a diagram illustrating an example of magnetic tracks of the rotating body illustrated in FIG. 2.
Figure 4:
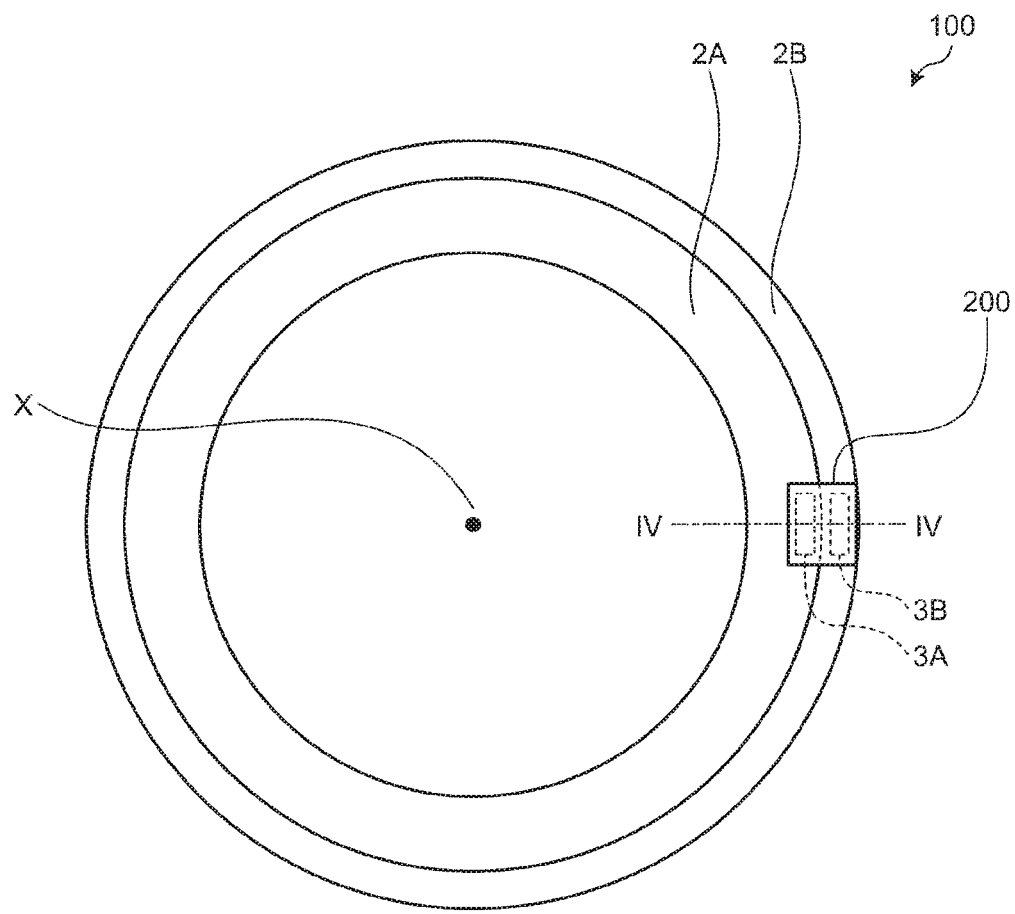
FIG. 4 is a diagram illustrating an arrangement example of a magnetic sensor module of the rotation angle detection device according to the first embodiment.
Figure 5:
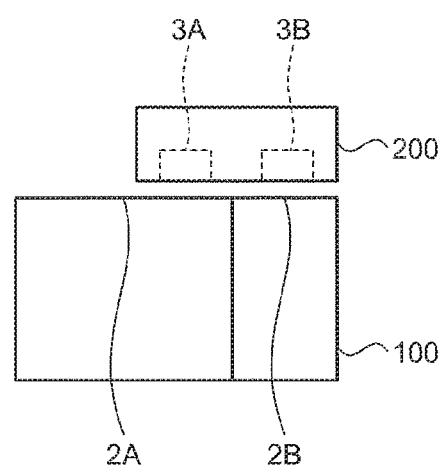
FIG. 5 is a sectional view, along IV-IV illustrated in FIG. 4, of the rotation angle detection device according to the first embodiment.
Figure 6:
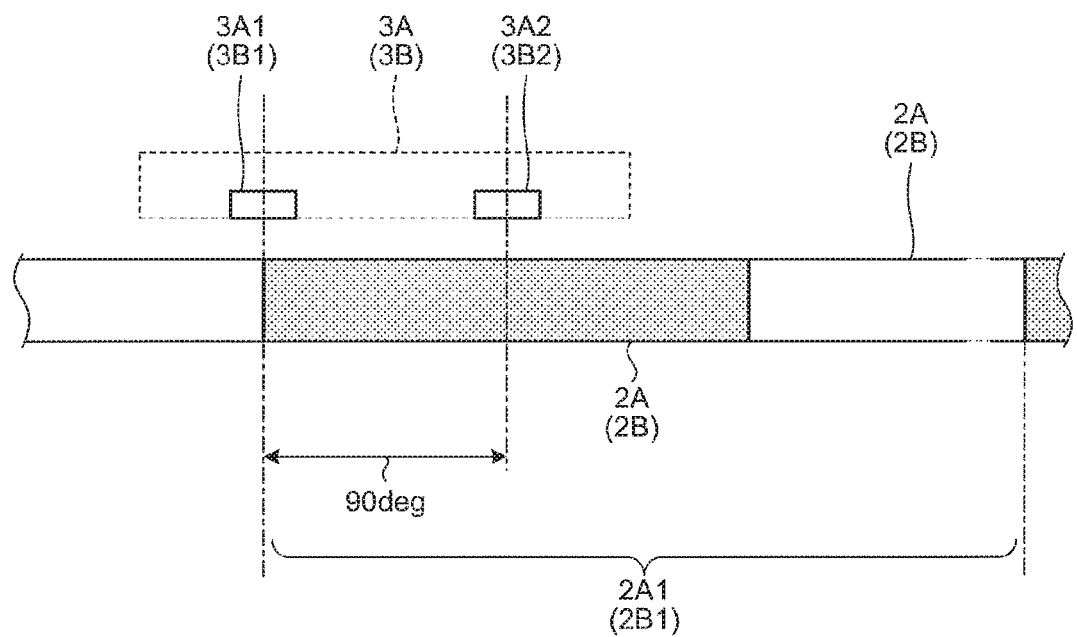
FIG. 6 is a diagram illustrating an example of magnetic sensors of the rotation angle detection device according to the first embodiment.

FIG. 2 is a diagram illustrating an example of the rotating body of the rotation angle detection device according to the first embodiment. FIG. 3 is a diagram illustrating an example of the magnetic tracks of the rotating body illustrated in FIG. 2. FIG. 4 is a diagram illustrating an arrangement example of the magnetic sensor module of the rotation angle detection device according to the first embodiment. FIG. 5 is a sectional view, along IV-IV illustrated in FIG. 4, of the rotation angle detection device according to the first embodiment. FIG. 6 is a diagram illustrating an example of the magnetic sensors of the rotation angle detection device according to the first embodiment.

As illustrated in FIGS. 2 and 3, the first magnetic track 2A along which magnetic pole pairs 2A1 are arranged at even intervals and the second magnetic track 2B along which magnetic pole pairs 2B1 are arranged at even intervals, are provided on the rotating body 100 of the first embodiment so as to be arranged in the radial direction in concentric ring shapes having the axis center at a rotation axis X of the rotating body 100. Each of the magnetic pole pairs has a north pole and a south pole. The first magnetic track 2A and the second magnetic track 2B of the first embodiment are obtained by, for example, circumferentially alternately magnetizing one end face in the axial direction of the rotating body 100 into the north pole and the south pole at even intervals.

Specifically, on the first magnetic track 2A and the second magnetic track 2B, the circumferentially different magnetic poles are alternately arranged at equal intervals, for example, such that, in FIG. 3, shaded portions are the north poles and non-shaded portions are south poles.

In the example illustrated in FIG. 3, the first magnetic track 2A includes 32 pairs of the magnetic pole pairs 2A1. The second magnetic track 2B includes 31 pairs of the magnetic pole pairs 2B1. In other words, when P (P is a natural number) denotes the number of the magnetic pole pairs 2A1 on the first magnetic track 2A, the number of the magnetic pole pairs 2B1 on the second magnetic track 2B is P−1.

The rotating body 100 can include, for example, neodymium magnets, ferrite magnets, or samarium-cobalt magnets according to a required magnetic flux density.

The present embodiment has an axial configuration in which the first magnetic track 2A and the second magnetic track 2B are magnetized on one end face in the axial direction of the rotating body 100. Such a configuration can thin the rotation angle detection device 1 in the axial direction thereof, and can enlarge a hollow hole thereof. This configuration can expand the scope of application of the rotation angle detection device 1 according to the first embodiment, including, for example, applications to inner-ring rotating and outer-ring rotating bearings, and applications to structures of devices in which cables are wired through the hollow hole. The configuration can also increase the degree of freedom of designing a device to which the rotation angle detection device 1 according to the first embodiment is applied.

As illustrated in FIGS. 4 and 5, the magnetic sensor module 200 of the first embodiment is provided so as to be opposed in the axial direction to the rotating body 100 that has the first magnetic track 2A and the second magnetic track 2B, with a gap therebetween.

More specifically, the first magnetic sensor 3A of the magnetic sensor module 200 is opposed to the first magnetic track 2A and detects a magnetic field of the first magnetic track 2A. The second magnetic sensor 3B of the magnetic sensor module 200 is opposed to the second magnetic track 2B and detects a magnetic field of the second magnetic track 2B.

The magnetic sensor module 200 is provided at a fixed place that does not rotate in synchronization with the rotating body 100.

As illustrated in FIG. 6, the first magnetic sensor 3A includes two magnetic sensor elements 3A1 and 3A2 arranged separately in the direction of arrangement of the magnetic pole pairs 2A1 so as to have a phase difference therebetween of 90 degrees in terms of electrical angle on the assumption that one period corresponds to a pitch of each of the magnetic pole pairs 2A1 on the first magnetic track 2A. The second magnetic sensor 3B includes two magnetic sensor elements 3B1 and 3B2 arranged separately in the direction of arrangement of the magnetic pole pairs 2B1 so as to have a phase difference therebetween of 90 degrees in terms of electrical angle on the assumption that one period corresponds to a pitch of each of the magnetic pole pairs 2B1 on the second magnetic track 2B.

For example, magnetic sensor elements, such as Hall elements or magnetoresistance (MR) effect sensors, can be used as the magnetic sensor elements 3A1 and 3A2 and the magnetic sensor elements 3B1 and 3B2.

The first magnetic sensor 3A outputs a first sine signal sin $\theta_i 1$ and a first cosine signal cos $\theta_i 1$ corresponding to the phase in the magnetic pole pair 2A1.

The second magnetic sensor 3B outputs a second sine signal sin $\theta_i 2$ and a second cosine signal cos $\theta_i 2$ corresponding to the phase in the magnetic pole pair 2B1.

As illustrated in FIG. 1, the first sine signal sin $\theta_i 1$ and the first cosine signal cos $\theta_i 1$ output from the first magnetic sensor 3A are supplied to the first correction calculator 4A. The second sine signal sin $\theta_i 2$ and the second cosine signal cos $\theta_i 2$ output from the second magnetic sensor 3B are supplied to the second correction calculator 4B.

The first correction calculator 4A performs correction calculation processing described later on the first sine signal $\sin \theta_i 1$ and the first cosine signal $\cos \theta_i 1$ thus supplied, and outputs a first corrected sine signal $\sin \theta_o 1$ and a first corrected cosine signal $\cos \theta_o 1$. The second correction calculator 4B performs the correction calculation processing described later on the second sine signal $\sin \theta_i 2$ and the second cosine signal $\cos \theta_i 2$ and outputs a second corrected sine signal $\sin \theta_o 2$ and a second corrected cosine signal $\cos \theta_o 2$. The correction calculation processing performed by the first correction calculator 4A and the second correction calculator 4B will be described in detail later.

Figure 7:
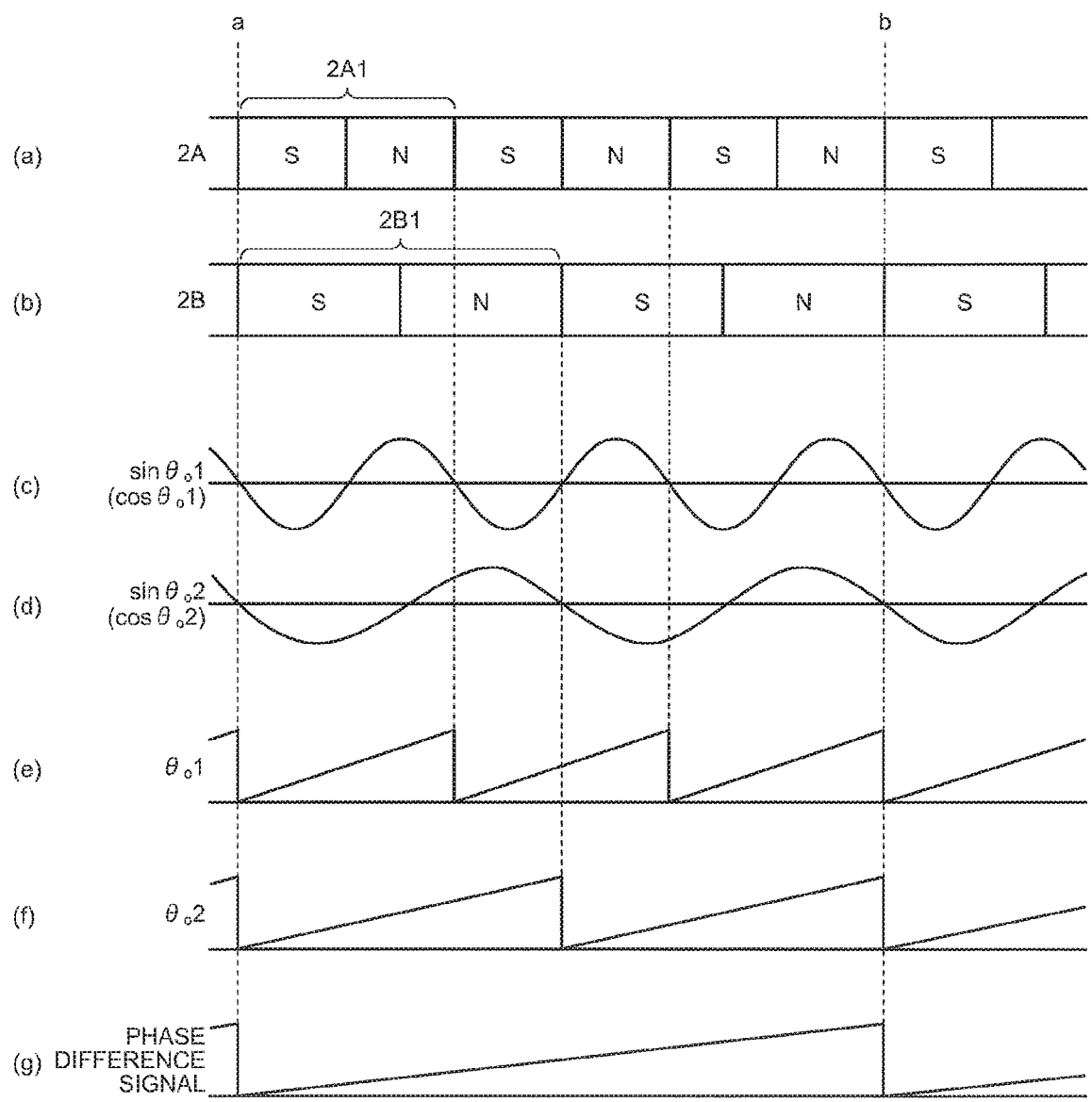
FIG. 7 is a diagram illustrating waveform examples of respective portions of the rotation angle detection device according to the first embodiment.

FIG. 7 is a diagram illustrating waveform examples of respective portions of the rotation angle detection device according to the first embodiment. Part (a) of FIG. 7 illustrates a magnetic pole pattern of the first magnetic track 2A, and part (b) of FIG. 7 illustrates an example of a magnetic pole pattern of the second magnetic track 2B. Part (c) of FIG. 7 illustrates an input signal waveform of the first phase detector 5A, and part (d) of FIG. 7 illustrates an input signal waveform of the second phase detector 5B. Part (e) of FIG. 7 illustrates a detected phase signal waveform output from the first phase detector 5A, and part (f) of FIG. 7 illustrates a detected phase signal waveform output from the second phase detector 5B. Part (g) of FIG. 7 illustrates a phase difference signal waveform output from the phase difference detector 6.

FIG. 7 illustrates an example in which two of the magnetic pole pairs 2B1 on the second magnetic track 2B correspond to a segment from point a to point b consisting of three of the magnetic pole pairs 2A1 on the first magnetic track 2A. In other words, the phase of a detection signal of the first magnetic sensor 3A coincides with the phase of a detection signal of the second magnetic sensor 38 at point a and point b. In this case, an absolute angle with respect to point a can be detected in any position up to point b. In this manner, the absolute angle can be detected between the two points at which the phase of the detection signal of the first magnetic sensor 3A coincides with the phase of the detection signal of the second magnetic sensor 3B.

In the example illustrated in FIG. 3, the number of the magnetic pole pairs 2A1 on the first magnetic track 2A is 32 (P=32) while the number of the magnetic pole pairs 2B1 on the second magnetic track 2B is 31 (P-1=31), and the magnetic pole phase of the first magnetic track 2A coincides with the magnetic pole phase of the second magnetic track 2B at point A. In other words, the magnetic sensor module 200 can detect the absolute angle in the entire circumference of the rotating body 100 with respect to point A serving as the origin position where the phase of the detection signal of the first magnetic sensor 3A coincides with the phase of the detection signal of the second magnetic sensor 3B.

The relation between the number of the magnetic pole pairs 2A1 on the first magnetic track 2A and the number of the magnetic pole pairs 2B1 on the second magnetic track 2B is not limited to that of the example illustrated in FIG. 3. For example, the configuration may be such that the number of the magnetic pole pairs 2B1 on the second magnetic track 2B is P+1 when the number of the magnetic pole pairs 2A1 on the first magnetic track 2A is P.

The first phase detector 5A outputs the detected phase signal exemplified in part (e) of FIG. 7 based on the input signal exemplified in part (c) of FIG. 7. Specifically, the first phase detector 5A calculates the phase ($\theta_o 1$=arctan ($\sin \theta_o 1/\cos \theta_o 1$)) in the magnetic pole pair 2A1 from the first corrected sine signal $\sin \theta_o 1$ and the first corrected cosine signal $\cos \theta_o 1$ that are the outputs from the first correction calculator 4A.

The second phase detector 5B outputs the detected phase signal exemplified in part (f) of FIG. 7 based on the input signal exemplified in part (d) of FIG. 7. Specifically, the second phase detector 5B calculates the phase ($\theta_o 2$=arctan ($\sin \theta_o 2/\cos \theta_o 2$)) in the magnetic pole pair 231 from the second corrected sine signal $\sin \theta_o 2$ and the second corrected cosine signal $\cos \theta_o 2$ that are the outputs from the second correction calculator 43.

The phase difference detector 6 outputs the phase difference signal exemplified in part (g) of FIG. 7 based on the respective detected phase signals output from the first phase detector 5A and the second phase detector 5B.

The angle calculator 7 performs processing to convert the phase difference obtained by the phase difference detector 6 into the absolute angle in accordance with a preset calculation parameter. The calculation parameter used by the angle calculator 7 is stored in the storage 10.

In the present embodiment, the angle information generator 8 is further provided at the subsequent stage of the angle calculator 7.

The angle information generator 8 generates, for example, a phase ABZ signal composed of a phase A signal and a phase B signal different from each other in phase by 90 degrees, and a phase Z signal indicating the origin position, as information including the absolute angle calculated by the angle calculator 7 (hereinafter, also called "absolute angle information"). The phase A signal and the phase B signal only need to be obtained using, for example, either one set of a set of the first corrected sine signal and the first corrected cosine signal, which are the outputs from the first correction calculator 4A, and a set of the second corrected sine signal and the second corrected cosine signal, which are the outputs of the second correction calculator 4B.

The transmitter 9 converts the absolute angle information generated by the angle information generator 8 into an appropriate signal (for example, a phase ABZ signal, a parallel signal, serial data, an analog voltage, or a pulse-width modulated (PWM) signal) and outputs the result to an external control device.

In this manner, the configuration of outputting the absolute angle information converted into the appropriate signal can reduce the number of electrical connection lines to the external control device.

An aspect may be employed in which, for example, an output request signal for the absolute angle information is transmitted from the external control device to the transmitter 9. In this case, the rotation angle detection device 1 may be configured to operate in response to the output request signal for the absolute angle information and output the absolute angle information from the transmitter 9.

The storage 10 stores, in addition to the calculation parameter used by the angle calculator 7, information required for the operation of the rotation angle detection device 1, including, for example, the number (P) of the magnetic pole pairs 2A1 on the first magnetic track 2A, the number (P+1) of the magnetic pole pairs 2B1 on the second magnetic track 2B, first magnetic sensor correction information used by the first correction calculator 4A, which will be described later, second magnetic sensor correction information used by the second correction calculator 4B, which will be described later, and a reference position of the absolute angle. Examples of the storage 10 include a non-volatile memory.

In the present embodiment, the storage 10 stores parameters and arithmetic expressions used by the first correction calculator 4A and the second correction calculator 4B as the first magnetic sensor correction information and the second magnetic sensor correction information.

The parameters and the arithmetic expressions used by the first correction calculator 4A include information used for correcting the first sine signal sin $\theta_i 1$ and the first cosine signal cos $\theta_i 1$, which are the detection signals of the first magnetic sensor 3A. The parameters and the arithmetic expressions are set as the first magnetic sensor correction information such that the detection signal of the first magnetic sensor 3A comes closer to a pre-assumed reference value of the sine signal or the cosine signal of the first magnetic sensor 3A.

The parameters and the arithmetic expressions used by the second correction calculator 4B include information used for correcting the second sine signal sin $\theta_i 2$ and the second cosine signal cos $\theta_i 2$, which are the detection signals of the second magnetic sensor 3B. The parameters and the arithmetic expressions are set as the second magnetic sensor correction information such that the detection signal of the second magnetic sensor 3B comes closer to a pre-assumed reference value of the sine signal or the cosine signal of the second magnetic sensor 3B.

The various parameters and information stored in the storage 10 may be configured to be updatable, for example, from the external control device through the transmitter 9. This configuration allows setting of the rotation angle detection device 1 according to the use situation thereof.

Configuration and Operation of Correction Calculator

The first magnetic track 2A and the second magnetic track 2B are the same in configuration and operation, the first magnetic sensor 3A and the second magnetic sensor 3B are the same in configuration and operation, and the first correction calculator 4A and the second correction calculator 4B are the same in configuration and operation. Therefore, in the following description, each of the first magnetic track 2A and the second magnetic track 2B is also called a "magnetic track 2"; each of the first magnetic sensor 3A and the second magnetic sensor 3B is also called a "magnetic sensor 3"; each of the first correction calculator 4A and the second correction calculator 4B is also called a "correction calculator 4"; and each of the first magnetic sensor correction information and the second magnetic sensor correction information is also called "magnetic sensor correction information".

Figure 8:
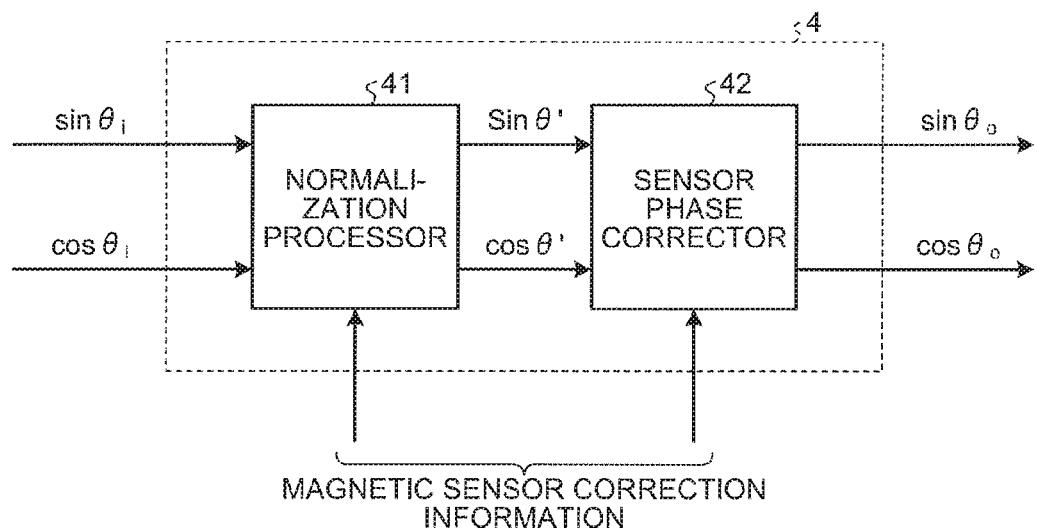
FIG. 8 is a diagram illustrating an example of functional blocks of a correction calculator according to the first embodiment.
Figure 9:
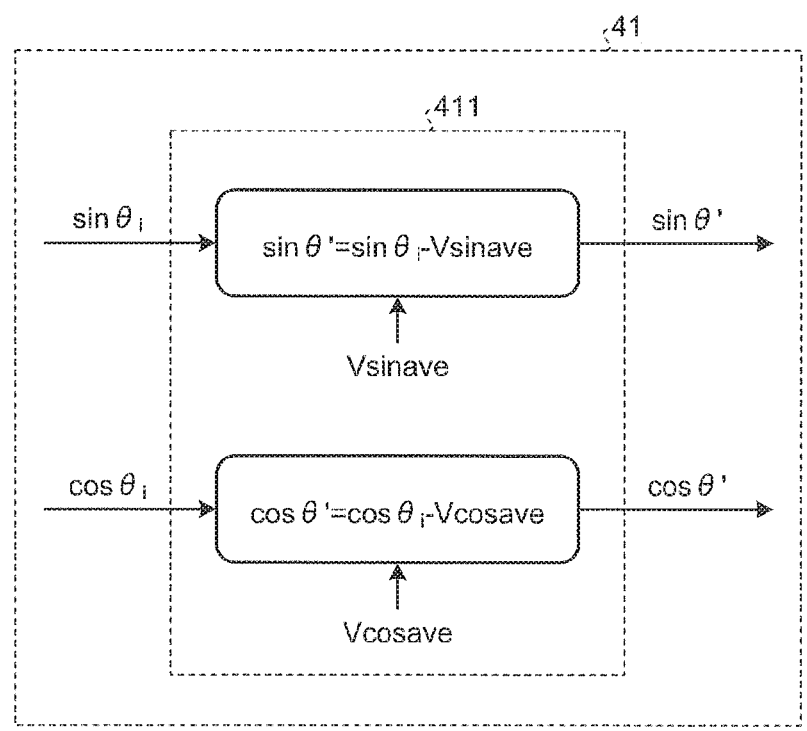
FIG. 9 is a diagram illustrating an example of a control block of a normalization processor according to the first embodiment.

FIG. 9 is a diagram illustrating an example of functional blocks of the correction calculator according to the first embodiment. As illustrated on FIG. 8, the correction calculator 4 includes a normalization processor 41 and a sensor phase corrector 42.

The correction calculator 4 receives the sine signal sin $\theta_i$ and the cosine signal cos $\theta_i$ output from the magnetic sensor 3. The correction calculator 4 acquires the magnetic sensor correction information to be applied to the normalization processor 41 and the sensor phase corrector 42 from the storage 10.

The normalization processor 41 normalizes the sine signal sin $\theta_i$ and the cosine signal cos $\theta_i$ output from the magnetic sensor 3 and outputs a normalized sine signal sin $\theta'$ and a normalized cosine signal cos $\theta'$ to the sensor phase corrector 42.

The sensor phase corrector 42 corrects the phases of the normalized sine signal sin $\theta'$ and the normalized cosine signal cos $\theta'$ and outputs a corrected sine signal sin $\theta_o$ and a corrected cosine signal cos $\theta_o$.

The following describes each component of the correction calculator 4 according to the first embodiment.

Figure 10:
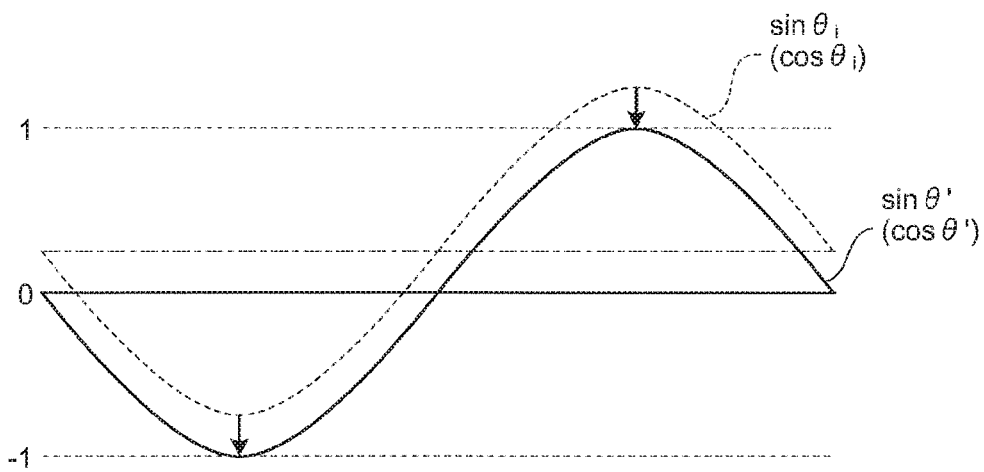
FIG. 10 is a diagram illustrating an example of a normalization operation performed by the normalization processor illustrated in FIG. 9.

The normalization processor 41 according to the first embodiment will first be described. FIG. 9 is a diagram illustrating an example of a control block of the normalization processor according to the first embodiment. FIG. 10 is a diagram illustrating an example of a normalization operation performed by the normalization processor illustrated in FIG. 9.

In the example illustrated in FIG. 9, the normalization processor 41 includes an offset voltage corrector 411. In the example illustrated in FIG. 10, a dashed line indicates the sine signal sin $\theta_i$ (cosine signal cos $\theta_i$), and a solid line indicates the normalized sine signal sin $\theta'$ (normalized cosine signal cos $\theta'$).

The example illustrated in FIGS. 9 and 10 assumes a case where an offset voltage is superimposed on the detection signal of the magnetic sensor 3.

For the offset voltage corrector 411 illustrated in FIG. 9, an average value V sin ave (V cos ave) of the sine signal (cosine signal), which is the detection signal of the magnetic sensor 3, is set as the magnetic sensor correction information and stored in the storage 10 in advance. The average value V sin ave may be, for example, an average value of a predetermined number of cycles of the sine signal, or an average value of any one cycle of the sine signal in terms of electrical angle on the magnetic track 2. The average value V cos ave may be, for example, an average value of a predetermined number of cycles of the cosine signal, or an average value of any one cycle of the cosine signal in terms of electrical angle on the magnetic track 2. The average value V sin ave (V cos ave) of the sine signal (cosine signal) may be, for example, a value measured at a shipping inspection of the rotation angle detection device 1.

In the example illustrated in FIG. 9, the offset voltage corrector 411 uses the average value V sin ave, which is the detection signal of the magnetic sensor 3, to normalize the offset voltage of the sine signal sin $\theta_i$. Specifically, the normalized sine signal sin $\theta'$ is calculated by subtracting V sin ave from the sine signal sin $\theta_i$, that is, using Expression (1) below.

$$\sin \theta' = \sin \theta_i - V \sin \text{ave} \quad (1)$$

For the offset voltage corrector 411 illustrated in FIG. 9, Expression (1) above is stored in the storage 10 and set as the magnetic sensor correction information in advance. The offset voltage corrector 411 uses Expression (1) above to normalize the offset voltage of the sine signal sin $\theta_i$, and thereby outputs the normalized sine signal sin $\theta'$ indicated by the solid line in FIG. 10.

In the example illustrated in FIG. 9, the offset voltage corrector 411 uses the average value V cos ave of the cosine signal, which is the detection signal of the magnetic sensor 3, to normalize the offset voltage of the cosine signal cos $\theta_i$. Specifically, the normalized cosine signal cos $\theta'$ is calculated by subtracting V cos ave from the cosine signal cos $\theta_i$, that is, using Expression (2) below.

$$\cos \theta' = \cos \theta_i - V \cos \text{ave} \quad (2)$$

For the offset voltage corrector 411 illustrated in FIG. 9, Expression (2) above is stored in the storage 10 and set as the magnetic sensor correction information in advance. The offset voltage corrector 411 uses Expression (2) above to normalize the offset voltage of the cosine signal cos $\theta_i$, and thereby outputs the normalized cosine signal cos $\theta'$ indicated by the solid line in FIG. 10.

Figure 11:
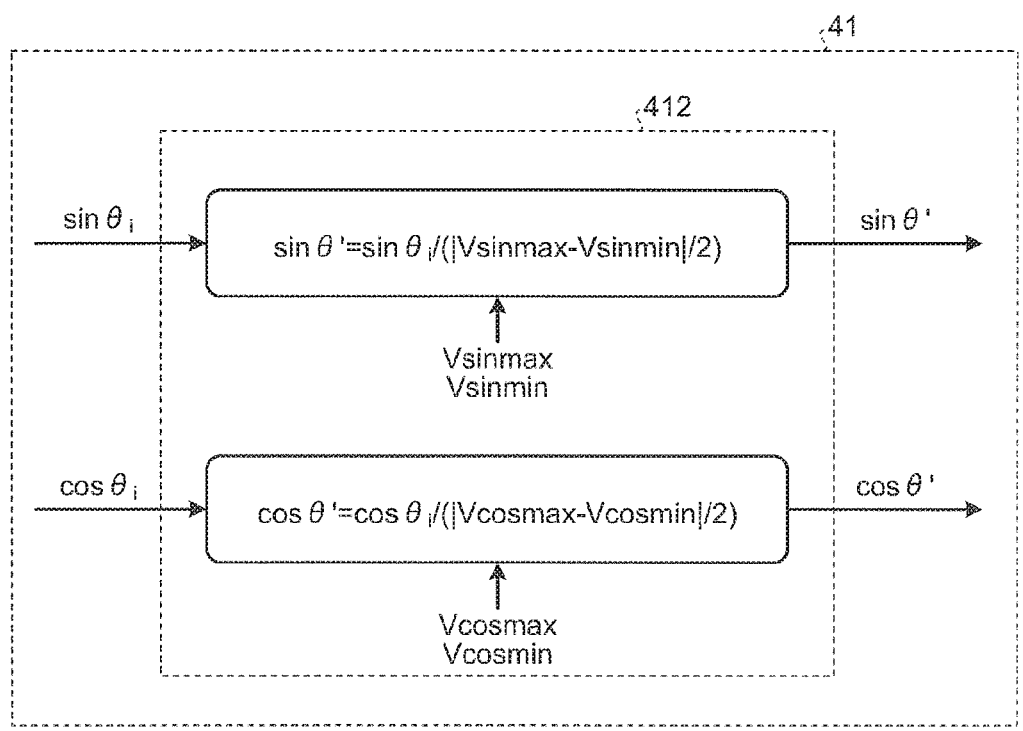
FIG. 11 is a diagram illustrating an example, different from that of FIG. 9, of the control block of the normalization processor according to the first embodiment.
Figure 12:
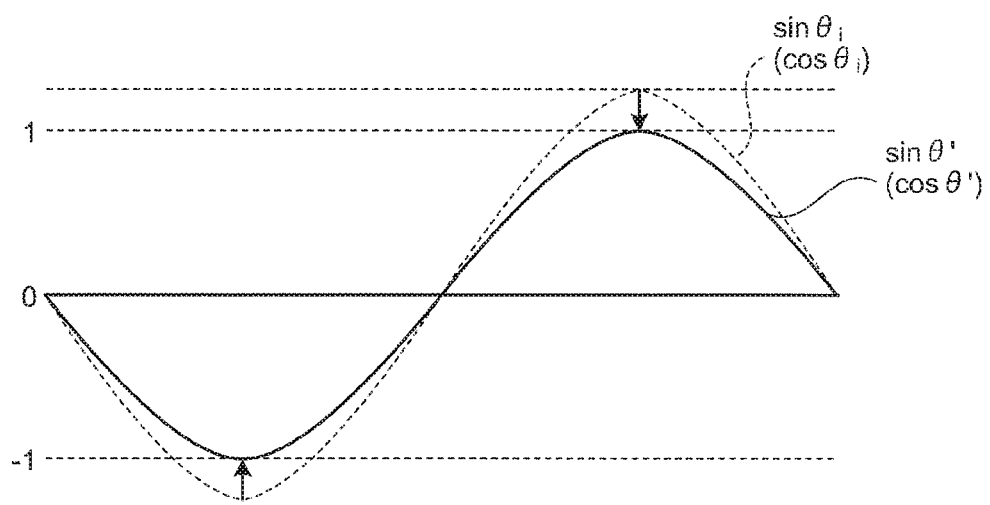
FIG. 12 is a diagram illustrating an example of the normalization operation performed by the normalization processor illustrated in FIG. 11.

FIG. 11 is a diagram illustrating an example, different from that of FIG. 9, of the control block of the normalization processor according to the first embodiment. FIG. 12 is a diagram illustrating an example of the normalization operation performed by the normalization processor illustrated in FIG. 11. In the example illustrated in FIG. 11, the normalization processor 41 includes an amplitude corrector 412. In the example illustrated in FIG. 12, a dashed line indicates the sine signal sin $\theta_i$ (cosine signal cos $\theta_i$), and a solid line indicates the normalized sine signal sin $\theta'$ (normalized cosine signal cos $\theta'$).

The example illustrated in FIGS. 11 and 12 assumes a case where a variation in output amplitude is present in the detection signal of the magnetic sensor 3.

For the amplitude corrector 412 illustrated in FIG. 11, a maximum value V sin max (V cos max) and a minimum value V sin min (V cos min) of the sine signal (cosine signal), which is the detection signal of the magnetic sensor 3, are set as the magnetic sensor correction information and stored in the storage 10 in advance. The maximum value V sin max of the sine signal may be, for example, the average value of maximum values of the sine signal in respective cycles of a predetermined number of cycles, or a maximum value of the sine signal in any one cycle, in terms of electrical angle on the magnetic track 2. The minimum value V sin min of the sine signal may be, for example, the average value of minimum values of the sine signal in respective cycles of a predetermined number of cycles, or a minimum value of the sine signal in any one cycle, in terms of electrical angle on the magnetic track 2. The maximum value V cos max of the cosine signal may be, for example, the average value of maximum values of the cosine signal in respective cycles of a predetermined number of cycles, or a maximum value of the cosine signal in any one cycle, in terms of electrical angle on the magnetic track 2. The minimum value V cos min of the cosine signal may be, for example, the average value of minimum values of the cosine signal in respective cycles of a predetermined number of cycles, or a minimum value of the cosine signal in any one cycle, in terms of electrical angle on the magnetic track 2. The maximum value V sin max (V cos max) and the minimum value V sin min (V cos min) of the sine signal (cosine signal) may be, for example, values measured at the shipping inspection of the rotation angle detection device 1.

In the example illustrated in FIG. 11, the amplitude corrector 412 uses the maximum value V sin max and the minimum value V sin min of the sine signal to normalize the amplitude of the sine signal sin $\theta_i$. Specifically, the normalized sine signal sin $\theta'$ is calculated by dividing the sine signal sin $\theta_i$ by a value obtained by dividing the absolute value of a value obtained by subtracting V sin min from V sin max by two, that is, using Expression (3) below.

$$\sin \theta' = \sin \theta_i / (|V \sin \max - V \sin \min|/2) \quad (3)$$

For the amplitude corrector 412 illustrated in FIG. 11, Expression (3) above is stored in the storage 10 and set as the magnetic sensor correction information in advance. The amplitude corrector 412 uses Expression (3) above to normalize the amplitude of the sine signal sin $\theta_i$, and thereby outputs the normalized sine signal sin $\theta'$ having the normalized amplitude indicated by the solid line in FIG. 12.

In the example illustrated in FIG. 11, the amplitude corrector 412 uses the maximum value V cos max and the minimum value V cos min of the cosine signal to normalize the amplitude of the cosine signal cos $\theta_i$. Specifically, the normalized cosine signal cos $\theta'$ is calculated by dividing the cosine signal cos $\theta_i$ by a value obtained by dividing the absolute value of a value obtained by subtracting V cos min from V cos max by two, that is, using Expression (4) below.

$$\cos \theta' = \cos \theta_i / (|V \cos \max - V \cos \min|/2) \quad (4)$$

For the amplitude corrector 412 illustrated in FIG. 11, Expression (4) above is stored in the storage 10 and set as the magnetic sensor correction information in advance. The amplitude corrector 412 uses Expression (4) above to normalize the amplitude of the cosine signal cos $\theta_i$, and thereby outputs the normalized cosine signal cos $\theta'$ having the normalized amplitude indicated by the solid line in FIG. 12.

Figure 13:
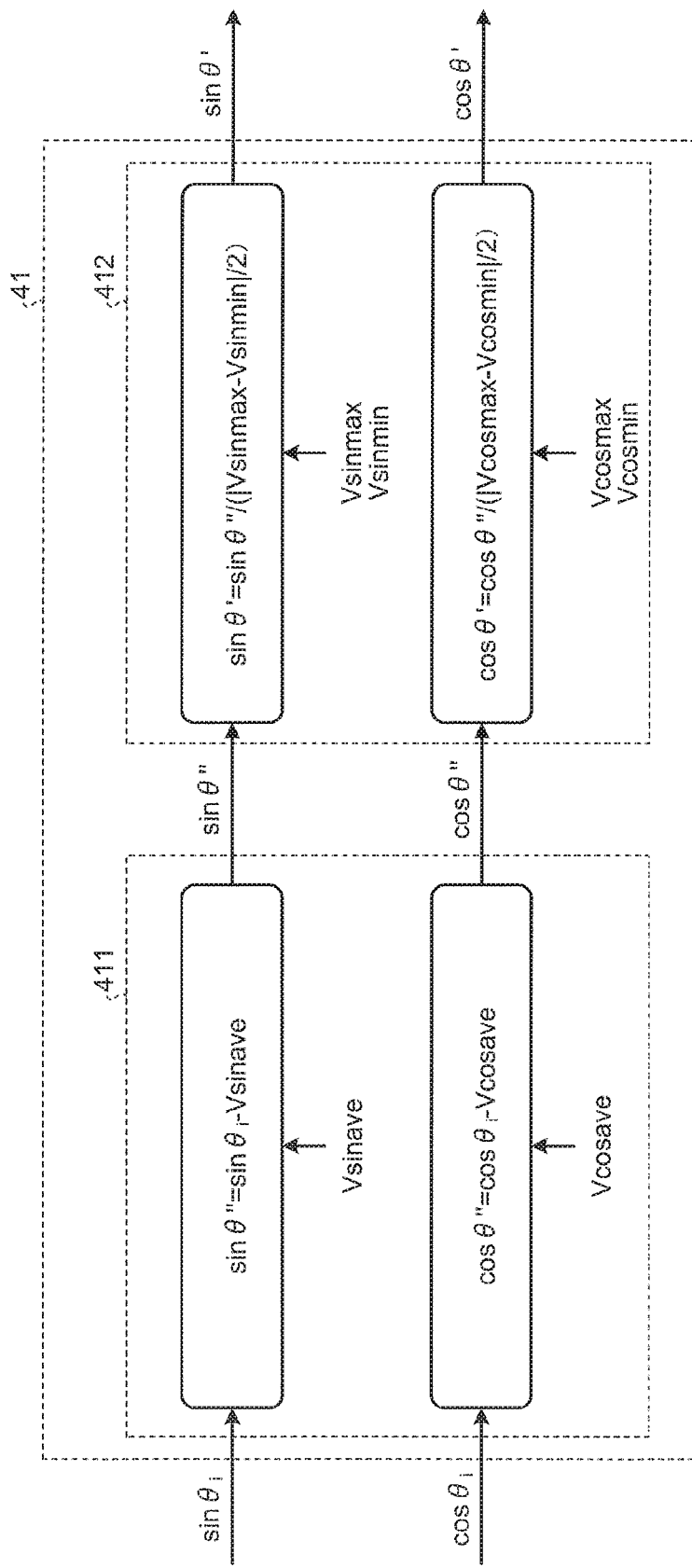
FIG. 13 is a diagram illustrating an example of the control block in which the normalization processor according to the first embodiment includes both an offset voltage corrector and an amplitude corrector.

In the examples described above, for convenience of explanation, the offset voltage corrector 411 and the amplitude corrector 412 included in the normalization processor 41 have been individually described. However, the normalization processor 41 preferably has a configuration including both the offset voltage corrector 411 and the amplitude corrector 412. FIG. 13 is a diagram illustrating an example of the control block in which the normalization processor according to the first embodiment includes both the offset voltage corrector and the amplitude corrector.

In the example illustrated in FIG. 13, the offset voltage corrector 411 uses the average value V sin ave, which is the detection signal of the magnetic sensor 3, to normalize the offset voltage of the sine signal sin $\theta_i$. Specifically, a normalized sine signal sin $\theta''$ is calculated by subtracting V sin ave from the sine signal sin $\theta_i$, that is, using Expression (5) below.

$$\sin \theta'' = \sin \theta_i - V \sin \text{ave} \quad (5)$$

For the offset voltage corrector 411 illustrated in FIG. 13, Expression (5) above is stored in the storage 10 and set as the magnetic sensor correction information in advance. The offset voltage corrector 411 uses Expression (5) above to normalize the offset voltage of the sine signal sin $\theta_i$.

In the example illustrated in FIG. 13, the offset voltage corrector 411 uses the average value V cos ave of the cosine signal, which is the detection signal of the magnetic sensor 3, to normalize the offset voltage of the cosine signal cos $\theta_i$. Specifically, a normalized cosine signal cos $\theta''$ is calculated by subtracting V cos ave from the cosine signal cos $\theta_i$, that is, using Expression (6) below.

$$\cos \theta'' = \cos \theta_i - V \cos \text{ave} \quad (6)$$

For the offset voltage corrector 411 illustrated in FIG. 13, Expression (6) above is stored in the storage 10 and set as the magnetic sensor correction information in advance. The offset voltage corrector 411 uses Expression (6) above to normalize the offset voltage of the cosine signal cos $\theta_i$.

In the example illustrated in FIG. 13, the amplitude corrector 412 uses the maximum value V sin max and the minimum value V sin min of the sine signal to normalize the amplitude of the normalized sine signal sin $\theta''$. Specifically, the normalized sine signal sin $\theta'$ is calculated by dividing the normalized sine signal sin $\theta''$ by the value obtained by dividing the absolute value of the value obtained by subtracting V sin min from V sin max by two, that is, using Expression (7) below.

$$\sin \theta' \sin \theta''/(|V \sin \max - V \sin \min|/2) \quad (7)$$

For the amplitude corrector 412 illustrated in FIG. 13, Expression (7) above is stored in the storage 10 and set as the magnetic sensor correction information in advance. The amplitude corrector 412 uses Expression (7) above to normalize the amplitude of the normalized sine signal sin $\theta''$.

In the example illustrated in FIG. 13, the amplitude corrector 412 uses the maximum value V cos max and the minimum value V cos min of the cosine signal to normalize the amplitude of the normalized cosine signal cos θ". Specifically, the normalized cosine signal cos θ' is calculated by dividing the normalized cosine signal cos θ" by the value obtained by dividing the absolute value of the value obtained by subtracting V cos min from V cos max by two, that is, using Expression (8) below.

$$\cos \theta' = \cos \theta''/(|V \cos \max - V \cos \min|/2) \qquad (8)$$

For the amplitude corrector 412 illustrated in FIG. 13, Expression (8) above is stored in the storage 10 and set as the magnetic sensor correction information in advance. The amplitude corrector 412 uses Expression (8) above to normalize the amplitude of the normalized cosine signal cos θ".

In other words, in the example illustrated in FIG. 13, the offset voltage corrector 411 first calculates the normalized sine signal sin θ" and the normalized cosine signal cos θ", respectively, by normalizing the offset voltages of the sine signal sin $\theta_i$ and the cosine signal cos $\theta_i$, and then the amplitude corrector 412 calculates the normalized sine signal sin θ' and the normalized cosine signal cos θ', respectively, by normalizing the amplitude values of the normalized sine signal sin θ" and the normalized cosine signal cos θ". These operations can obtain the normalized sine signal sin θ' having both the normalized offset voltage and the normalized amplitude value of the sine signal sin $\theta_i$ and the normalized cosine signal cos θ' having both the normalized offset voltage and the normalized amplitude value of the cosine signal cos $\theta_i$.

Figure 14:
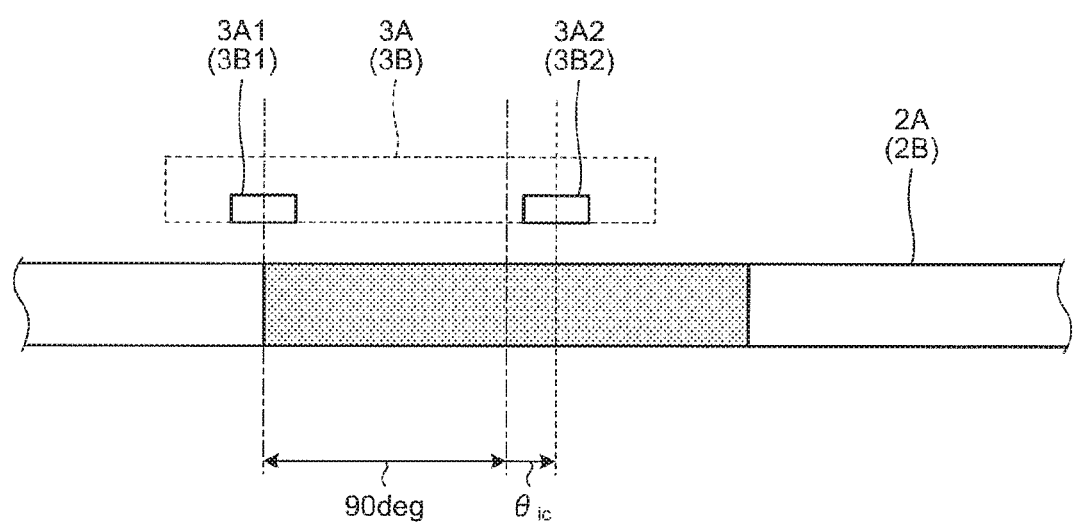
FIG. 14 is a diagram illustrating an example of a correction target of a sensor phase corrector according to the first embodiment.

The following describes the sensor phase corrector 42 according to the first embodiment. FIG. 14 is a diagram illustrating an example of a correction target of the sensor phase corrector according to the first embodiment.

As described above, the magnetic sensor elements 3A1 and 3A2 of the first magnetic sensor 3A are arranged separately from each other in the direction of arrangement of the magnetic pole pairs 2A1 so as to have a phase difference therebetween of 90 degrees in terms of electrical angle on the assumption that one period corresponds to a pitch of each of the magnetic pole pairs 2A1 on the first magnetic track 2A, and the magnetic sensor elements 3B1 and 3B2 of the second magnetic sensor 3B are arranged separately from each other in the direction of arrangement of the magnetic pole pairs 2B1 so as to have a phase difference therebetween of 90 degrees in terms of electrical angle on the assumption that one period corresponds to a pitch of each of the magnetic pole pairs 2B1 on the second magnetic track 2B. The present embodiment assumes a case where an error (hereinafter, called a "sensor phase error") $\theta_{ic}$ is included between an output phase of the magnetic sensor element 3A1 (3B1) and an output phase of the magnetic sensor element 3A2 (3B2). Such an assumption can be applied to cases including, for example, a case where a variation is present in the intervals between the magnetic poles provided on the magnetic track 2 and a case where the radial position of the magnetic sensor 3 on the magnetic track 2 varies during one turn of the rotating body 100, such as a case where the rotation axis X of the rotating body 100 is off the center thereof.

Examples illustrated in FIG. 14 and FIGS. 15 and 16 explained below represent an example of correcting the output phase of the magnetic sensor element 3A2 (3B2) using the magnetic sensor element 3A1 (3B1) as a reference.

Figure 15:
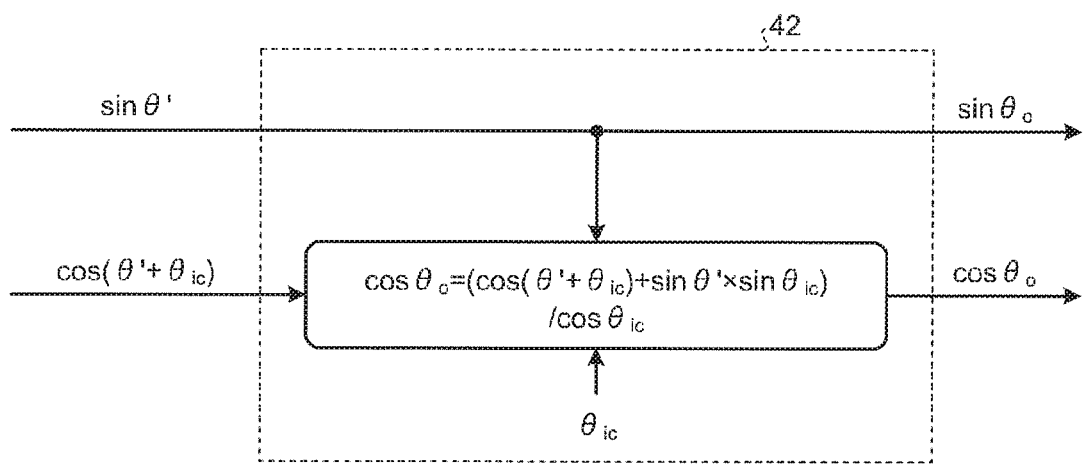
FIG. 15 is a diagram illustrating an example of a control block of the sensor phase corrector according to the first embodiment.
Figure 16:
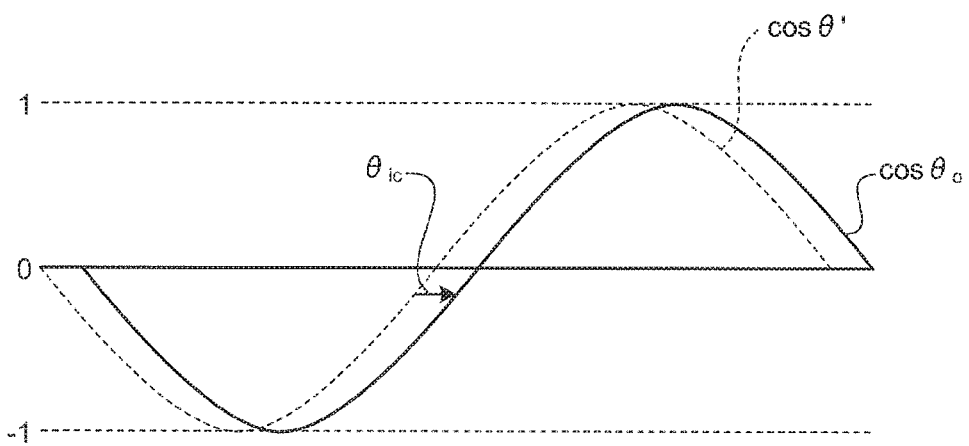
FIG. 16 is a diagram illustrating an example of a phase correction operation performed by the sensor phase corrector illustrated in FIG. 15.

FIG. 15 is a diagram illustrating an example of a control block of the sensor phase corrector according to the first embodiment. FIG. 16 is a diagram illustrating an example of a phase correction operation performed by the sensor phase corrector illustrated in FIG. 15. In the example illustrated in FIG. 16, a dashed line indicates the normalized cosine signal cos θ', and a solid line indicates the corrected cosine signal cos $\theta_o$.

For the sensor phase corrector 42 illustrated in FIG. 15, the sensor phase error θic between the output phase of the magnetic sensor element 3A1 (3B1) and the output phase of the magnetic sensor element 3A2 (3B2) is set as the first magnetic sensor correction information (second magnetic sensor correction information), and stored in the storage 10 in advance. The sensor phase error $\theta_{ic}$ may be, for example, a value measured at the shipping inspection of the rotation angle detection device 1.

In the example illustrated in FIG. 15, the sensor phase corrector 42 uses the sensor phase error $\theta_{ic}$ to correct the phase of the normalized cosine signal cos θ' using the normalized sine signal sin θ' as a reference. However, the sensor phase corrector 42 does not correct the normalized sine signal sin θ' serving as the reference. In other words, the corrected sine signal sin $\theta_o$ in the sensor phase corrector 42 can be represented by Expression (9) below.

$$\sin \theta_o = \sin \theta' \qquad (9)$$

The corrected cosine signal cos $\theta_o$ is represented by Expression (10) below.

$$\cos \theta_o = (\cos(\theta' + \theta_{ic}) + \sin \theta' \times \sin \theta_{ic})/\cos \theta_{ic} \qquad (10)$$

The sensor phase corrector 42 uses Expression (10) above to calculate the corrected cosine signal cos $\theta_o$. Hereinafter, Expression (10) above is also called a "first phase correction arithmetic expression".

For the sensor phase corrector 42 illustrated in FIG. 15, Expression (10) above, that is, the first phase correction arithmetic expression is stored in the storage 10 and set as the first magnetic sensor correction information (second magnetic sensor correction information) in advance. The sensor phase corrector 42 uses Expression (10) above, that is, the first phase correction arithmetic expression to correct the phase of the normalized cosine signal cos θ', and thereby outputs the corrected cosine signal cos $\theta_o$ indicated by the solid line in FIG. 16.

Figure 17:
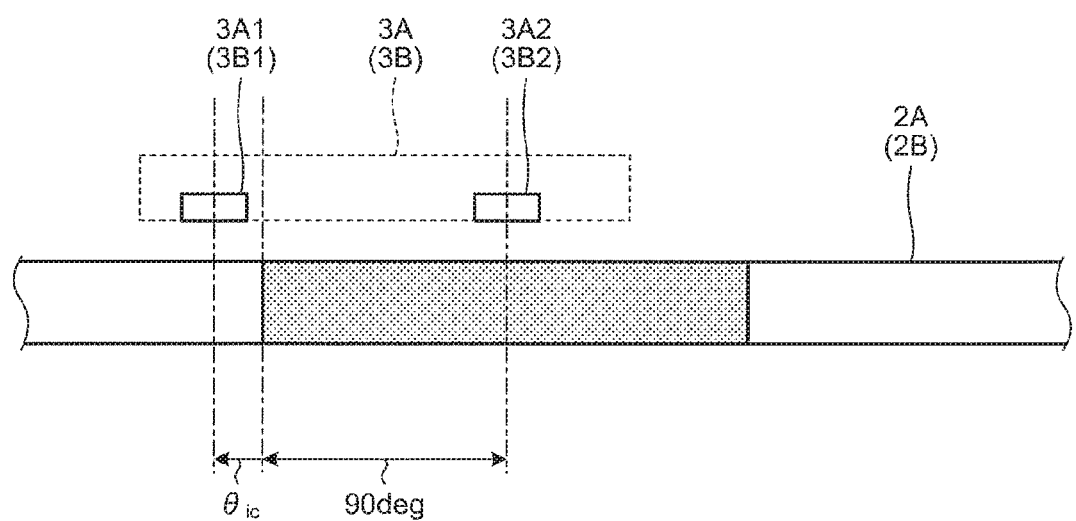
FIG. 17 is a diagram illustrating an example, different from that of FIG. 14, of the correction target of the sensor phase corrector according to the first embodiment.

FIG. 17 is a diagram illustrating an example, different from that of FIG. 14, of the correction target of the sensor phase corrector according to the first embodiment.

Examples illustrated in FIG. 17 and FIGS. 18 and 19 explained below represent an example of correcting the output phase of the magnetic sensor element 3A1 (3B1) using the magnetic sensor element 3A2 (3B2) as a reference.

Figure 18:
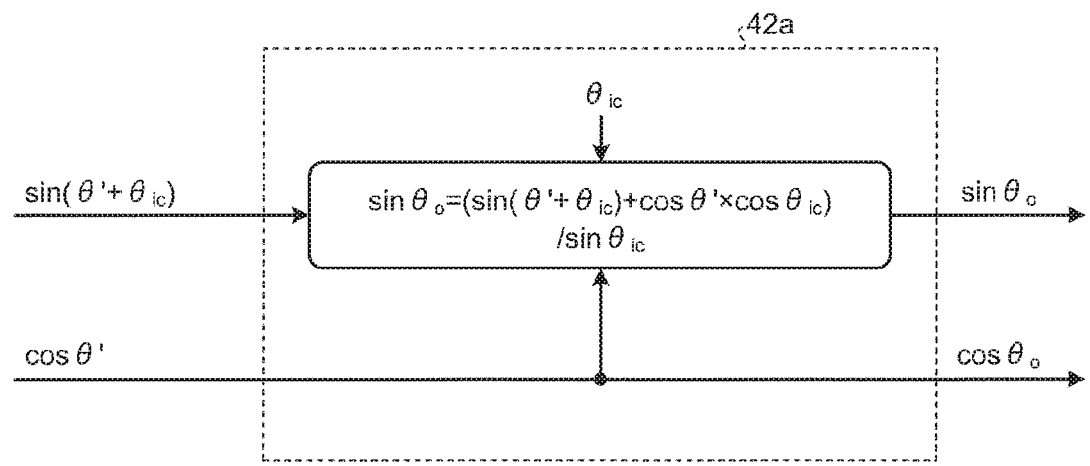
FIG. 18 is a diagram illustrating an example, different from that of FIG. 15, of the control block of the sensor phase corrector according to the first embodiment.
Figure 19:
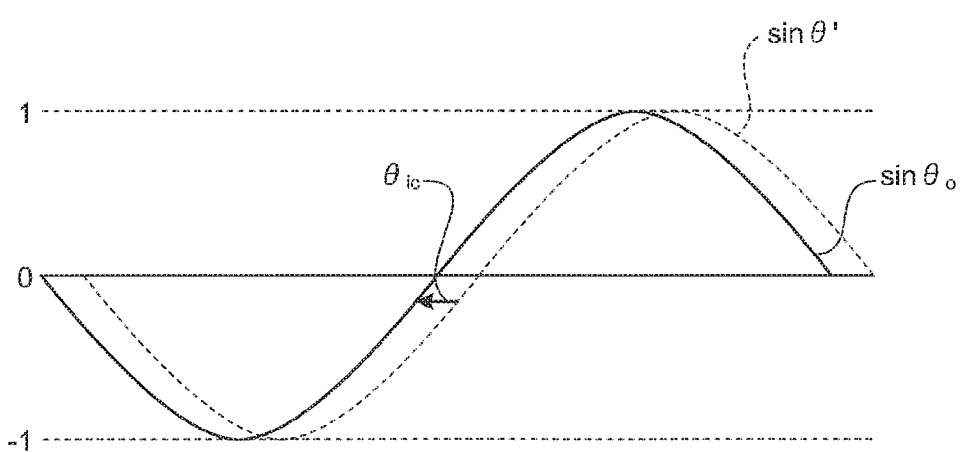
FIG. 19 is a diagram illustrating an example of a phase correction operation performed by the sensor phase corrector illustrated in FIG. 18.

FIG. 18 is a diagram illustrating an example, different from that of FIG. 15, of the control block of the sensor phase corrector according to the first embodiment. FIG. 19 is a diagram illustrating an example of a phase correction operation performed by the sensor phase corrector illustrated in FIG. 18. In the example illustrated in FIG. 19, a dashed line indicates the normalized sine signal sin θ', and a solid line indicates the corrected sine signal sin $\theta_o$.

For a sensor phase corrector 42a illustrated in FIG. 18, the sensor phase error $\theta_{ic}$ between the output phase of the magnetic sensor element 3A1 (3B1) and the output phase of the magnetic sensor element 3A2 (3B2) is set as the first magnetic sensor correction information (second magnetic sensor correction information), and stored in the storage 10 in advance. The sensor phase error $\theta_{ic}$ may be, for example, a value measured at the shipping inspection of the rotation angle detection device 1.

In the example illustrated in FIG. 18, the sensor phase corrector 42a uses the sensor phase error $\theta_{ic}$ to correct the phase of the normalized sine signal sin θ' using the normalized cosine signal cos θ' as a reference. However, the sensor phase corrector 42a does not correct the normalized cosine signal cos θ' serving as the reference. In other words, the corrected cosine signal cos $θ_o$ in the sensor phase corrector 42a can be represented by Expression (11) below.

$$\cos θ_o = \cos θ' \quad (11)$$

The corrected sine signal sin $θ_o$ is represented by Expression (12) below.

$$\sin θ_o = (\sin(θ'+θ_{ic}) + \cos θ' \times \cos θ_{ic})/\sin θ_{ic} \quad (12)$$

The sensor phase corrector 42 uses Expression (12) above to calculate the corrected sine signal sin $θ_o$. Hereinafter, Expression (12) above is also called a "second phase correction arithmetic expression".

For the sensor phase corrector 42a illustrated in FIG. 18, Expression (12) above, that is, the second phase correction arithmetic expression is stored in the storage 10 and set as the first magnetic sensor correction information (second magnetic sensor correction information) in advance. The sensor phase corrector 42a uses Expression (12) above, that is, the second phase correction arithmetic expression to correct the phase of the normalized sine signal sin θ', and thereby outputs the corrected sine signal sin $θ_o$ indicated by the solid line in FIG. 19.

The first correction calculator 4A includes the sensor phase corrector 42 or the sensor phase corrector 42a and thus can correct the output phase of the first magnetic sensor 3A. The second correction calculator 4B includes the sensor phase corrector 42 or the sensor phase corrector 42a and thus can correct the output phase of the second magnetic sensor 3B.

Figure 20:
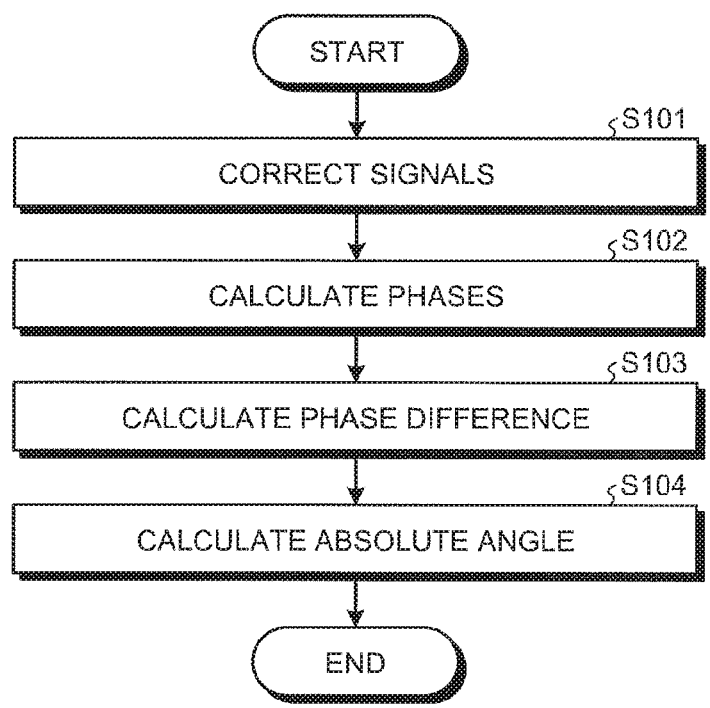
FIG. 20 is a diagram illustrating an example of a specific procedure of a rotation angle detection method according to the first embodiment.

The following describes a specific procedure of a rotation angle detection method according to the first embodiment. FIG. 20 is a diagram illustrating an example of the specific procedure of the rotation angle detection method according to the first embodiment.

First, the first correction calculator 4A corrects the first sine signal sin $θ_i1$ and the first cosine signal cos $θ_i1$ to the first corrected sine signal sin $θ_o1$ and the first corrected cosine signal cos $θ_o1$, respectively, based on the first magnetic sensor correction information; and the second correction calculator 4B corrects the second sine signal sin $θ_i2$ and the second cosine signal cos $θ_i2$ to the second corrected sine signal sin $θ_o2$ and the second corrected cosine signal cos $θ_o2$, respectively, based on the second magnetic sensor correction information (Step S3101).

Subsequently, the first phase detector 5A calculates a phase of the first corrected sine signal sin $θ_o1$ and the first corrected cosine signal cos $θ_o1$, and the second phase detector 5B calculates a phase of the second corrected sine signal sin $θ_o2$ and the second corrected cosine signal cos $θ_o2$ (Step S102).

Subsequently, the phase difference detector 6 calculates the phase difference between the first magnetic sensor 3A and the second magnetic sensor 3B based on the detected phase of the first magnetic sensor 3A and the detected phase of the second magnetic sensor 3B (Step S103).

Then, the angle calculator 7 converts the phase difference output from the phase difference detector 6 into the absolute angle (Step S104).

As described above, the rotation angle detection device 1 according to the first embodiment includes the rotating body 100, the first magnetic sensor 3A, the second magnetic sensor 3B, the storage 10, the first correction calculator 4A, the second correction calculator 4B, the first phase detector 5A, the second phase detector 5B, the phase difference detector 6, and the angle calculator 7. The rotating body 100 is a body on which the first magnetic track 2A along which the magnetic pole pairs 2A1 are arranged at even intervals and the second magnetic track 2B along which the magnetic pole pairs 2B1 are arranged at even intervals, are provided so as to be arranged in the radial direction in concentric ring shapes having the axis center at the rotation axis X. Each of the magnetic pole pairs has the north pole and the south pole. When the number of the magnetic pole pairs 2A1 on the first magnetic track 2A is P (P is a natural number), the number of the magnetic pole pairs 2B1 on the second magnetic track 2B is P−1 or P+1. The first magnetic sensor 3A detects the magnetic field of the first magnetic track 2A and outputs the first sine signal sin $θ_i1$ and the first cosine signal cos $θ_i1$. The second magnetic sensor 3B detects the magnetic field of the second magnetic track 2B and outputs the second sine signal sin $θ_i2$ and the second cosine signal cos $θ_i2$. The storage 10 stores the first magnetic sensor correction information and the second magnetic sensor correction information that are preset. The first magnetic sensor correction information is preset such that the value of the first sine signal sin $θ_i1$ output by the first magnetic sensor 3A corresponding to the rotation angle of the first magnetic track 2A comes closer to the reference value of the sine signal of the first magnetic sensor 3A, or such that the value of the first cosine signal cos $θ_i1$ output by the first magnetic sensor 3A corresponding to the rotation angle of the first magnetic track 2A comes closer to the reference value of the cosine signal of the first magnetic sensor 3A. The second magnetic sensor correction information is preset such that the value of the second sine signal sin $θ_i2$ output by the second magnetic sensor 3B corresponding to the rotation angle of the second magnetic track 2B comes closer to the reference value of the sine signal of the second magnetic sensor 3B, or such that the value of the second cosine signal cos $θ_i2$ output by the second magnetic sensor 3B corresponding to the rotation angle of the second magnetic track 2B comes closer to the reference value of the cosine signal of the second magnetic sensor 3B. The first correction calculator 4A corrects the first sine signal sin $θ_i1$ and the first cosine signal cos $θ_i1$ to the first corrected sine signal sin $θ_o1$ and the first corrected cosine signal cos $θ_o1$ based on the first magnetic sensor correction information. The second correction calculator 4B corrects the second sine signal sin $θ_i2$ and the second cosine signal cos $θ_i2$ to the second corrected sine signal sin $θ_o2$ and the second corrected cosine signal cos $θ_o2$ based on the second magnetic sensor correction information. The first phase detector 5A calculates the phase of the first corrected sine signal sin $θ_o1$ and the first corrected cosine signal cos $θ_o1$. The second phase detector 5B calculates the phase of the second corrected sine signal sin $θ_o2$ and the second corrected cosine signal cos $θ_o2$. The phase difference detector 6 calculates the phase difference between the first magnetic sensor 3A and the second magnetic sensor 3B based on the detected phase of the first magnetic sensor 3A and the detected phase of the second magnetic sensor 3B. The angle calculator 7 converts the phase difference into the absolute angle.

With this configuration, the rotation angle detection device 1 can correct in real time the sine signals and the cosine signals before the phases are calculated by the first phase detector 5A and the second phase detector 5B. The phases are calculated using the corrected sine signals and the corrected cosine signals that have been corrected from the sine signals and the cosine signals based on the known preset magnetic sensor correction information. Therefore, the detection accuracy of the absolute angle of the rotating body 100 is improved. Accordingly, the rotation angle detection device 1 according to the present embodiment can accurately detect the absolute angle of the rotating body 100.

For each of the correction calculators 4 (the first correction calculator 4A and the second correction calculator 4B), the average values V sin ave and V cos ave of the sine signal and the cosine signal that are the detection signals of the first magnetic sensor 3A (second magnetic sensor 3B), are stored in advance as the first magnetic sensor correction information (second magnetic sensor correction information) in the storage 10; and the offset voltage corrector 411 uses the average value V sin ave of the sine signal to correct the sine signal and uses the average value V cos ave of the cosine signal to correct the cosine signal. With this configuration, the offset voltages of the sine signal and the cosine signal can be normalized.

For each of the correction calculators 4 (the first correction calculator 4A and the second correction calculator 4B), the maximum values V sin max and V cos max and the minimum values V sin min and V cos min of the sine signal and the cosine signal that are the detection signals of the first magnetic sensor 3A (second magnetic sensor 3B), are stored in advance as the first magnetic sensor correction information (second magnetic sensor correction information) in the storage 10; and the amplitude corrector 412 uses the maximum value V sin max and the minimum value V sin min of the sine signal to correct the sine signal and uses the maximum value V cos max and the minimum value V cos min of the cosine signal to correct the cosine signal. With this configuration, the amplitude values of the sine signal and the cosine signal can be normalized.

With the configuration in which each of the correction calculators 4 (the first correction calculator 4A and the second correction calculator 4B) includes both the offset voltage corrector 411 and the amplitude corrector 412, the correction calculators 4 can normalize both the offset voltages and the amplitude values of the sine signal and the cosine signal.

For each of the correction calculators 4 (the first correction calculator 4A and the second correction calculator 4B), the sensor phase error $\theta_{ic}$ between the output phase of the magnetic sensor element 3A1 (3B1) and the output phase of the magnetic sensor element 3A2 (3B2) in the first magnetic sensor 3A (second magnetic sensor 3B) and the first phase correction arithmetic expression are stored in advance as the first magnetic sensor correction information (second magnetic sensor correction information) in the storage 10, and the sensor phase corrector 42 uses the sensor phase error $\theta_{ic}$ and the first phase correction arithmetic expression to correct the cosine signal. With this configuration, the output phase of the magnetic sensor element 3A2 (3B2) can be corrected using the magnetic sensor element 3A1 (3B1) as the reference. Alternatively, the sensor phase error $\theta_{ic}$ between the output phase of the magnetic sensor element 3A1 (3B1) and the output phase of the magnetic sensor element 3A2 (3B2) in the first magnetic sensor 3A (second magnetic sensor 3B) and the second phase correction arithmetic expression are stored in advance as the first magnetic sensor correction information (second magnetic sensor correction information) in the storage 10, and the sensor phase corrector 42a uses the sensor phase error $\theta_{ic}$ and the second phase correction arithmetic expression to correct the sine signal. With this configuration, the output phase of the magnetic sensor element 3A1 (3B1) can be corrected using the magnetic sensor element 3A2 (3B2) as the reference.

This configuration can improve the accuracy of position detection by the rotation angle detection device, and as a result, can contribute to an improvement in rotation control performance of various devices.

The rotation angle detection method according to the first embodiment includes; correcting the first sine signal sin $\theta_i 1$ and the first cosine signal cos $\theta_i 1$ to the first corrected sine signal sin $\theta_o 1$ and the first corrected cosine signal cos $\theta_o 1$ based on the first magnetic sensor correction information that is preset such that the value of the first sine signal sin $\theta_i 1$ output by the first magnetic sensor 3A, which detects the magnetic field of the first magnetic track 2A and outputs the first sine signal sin $\theta_i 1$ and the first cosine signal cos $\theta_i 1$ corresponding to the rotation angle of the first magnetic track 2A along which the magnetic pole pairs 2A1 each having the north pole and the south pole are arranged at even intervals, comes closer to the reference value of the sine signal of the first magnetic sensor 3A, or such that the value of the first cosine signal cos $\theta_i 1$ output by the first magnetic sensor 3A corresponding to the rotation angle of the first magnetic track 2A comes closer to the reference value of the cosine signal of the first magnetic sensor 3A (signal correction step); correcting the second sine signal sin $\theta_i 2$ and the second cosine signal cos $\theta_i 2$ to the second corrected sine signal sin $\theta_o 2$ and the second corrected cosine signal cos $\theta_o 2$ based on the second magnetic sensor correction information that is preset such that the value of the second sine signal sin $\theta_i 2$ output by the second magnetic sensor 3B, which detects the magnetic field of the second magnetic track 2B and outputs the second sine signal sin $\theta_i 2$ and the second cosine signal cos $\theta_i 2$ corresponding to the rotation angle of the second magnetic track 2B along which the magnetic pole pairs 2B1 are arranged at even intervals, comes closer to the reference value of the sine signal of the second magnetic sensor 3B, or such that the value of the second cosine signal cos $\theta_i 2$ output by the second magnetic sensor 3B corresponding to the rotation angle of the second magnetic track 2B comes closer to the reference value of the cosine signal of the second magnetic sensor 3B (signal correction step); calculating the phase of the first corrected sine signal sin $\theta_o 1$ and the first corrected cosine signal cos $\theta_o 1$ (phase calculation step); calculating the phase of the second corrected sine signal sin $\theta_o 2$ and the second corrected cosine signal cos $\theta_o 2$ (phase calculation step); calculating the phase difference between the first magnetic sensor 3A and the second magnetic sensor 3B based on the detected phase of the first magnetic sensor 3A and the detected phase of the second magnetic sensor 3B (phase difference calculation step); and converting phase difference into the absolute angle (absolute angle calculation step).

With this method, the sine signals and the cosine signals can be corrected in real time before the phases are calculated by the first phase detector 5A and the second phase detector 5B. The phases are calculated using the corrected sine signals and the corrected cosine signals that have been corrected from the sine signals and the cosine signals based on the known preset magnetic sensor correction information. Therefore, the detection accuracy of the absolute angle of the rotating body 100 is improved. Accordingly, with the rotation angle detection method according to the present embodiment, the absolute angle of the rotating body 100 can be accurately detected.

The first embodiment described above exemplifies the axial configuration in which the first magnetic track 2A and the second magnetic track 2B are magnetized on one end face in the axial direction of the rotating body 100. The configuration is, however, not limited thereto, and may be, for example, a radial configuration in which the first magnetic track 2A and the second magnetic track 2B are magnetized on the outer circumferential surface of the rotating body 100 and provided so as to be arranged in the axial direction.

Second Embodiment

For example, a configuration, a rotating body, magnetic tracks, and an arrangement of a magnetic sensor module of a rotation angle detection device according to a second embodiment are the same as those of the first embodiment, and therefore description thereof will not be repeated. The same components as those described above in the first embodiment are denoted by the same reference signs, and the description thereof will not be repeated. In the following description, each of the first magnetic track 2A and the second magnetic track 2B is also called a "magnetic track 2"; each of the first magnetic sensor 3A and the second magnetic sensor 3B is also called a "magnetic sensor 3"; each of the first correction calculator 4A and the second correction calculator 4B is also called a "correction calculator 4a"; and each of the first magnetic sensor correction information and the second magnetic sensor correction information is also called "magnetic sensor correction information".

Figure 21:
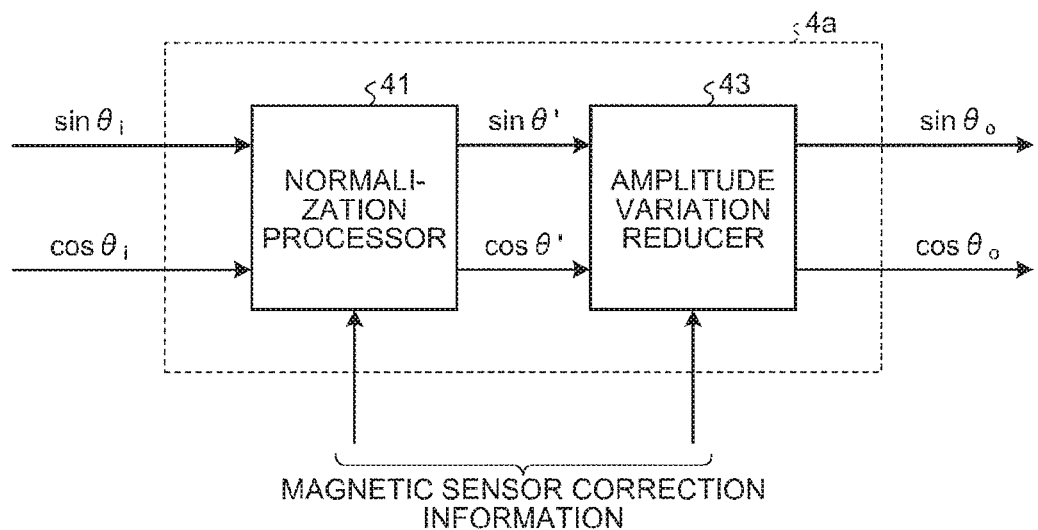
FIG. 21 is a diagram illustrating an example of functional blocks of a correction calculator according to a second embodiment.

FIG. 21 is a diagram illustrating an example of functional blocks of the correction calculator according to the second embodiment. As illustrated in FIG. 21, the correction calculator 4a according to the second embodiment includes the normalization processor 41 described in the first embodiment and an amplitude variation reducer 43.

The correction calculator 4a receives the sine signal $\sin \theta_i$ and the cosine signal $\cos \theta_i$ output from the magnetic sensor 3. The correction calculator 4a acquires the magnetic sensor correction information to be applied to the normalization processor 41 and the amplitude variation reducer 43 from the storage 10.

The normalization processor 41 normalizes the sine signal $\sin \theta_i$ and the cosine signal $\cos \theta_i$ output from the magnetic sensor 3 and outputs the normalized sine signal $\sin \theta'$ and the normalized cosine signal $\cos \theta'$ to the sensor phase corrector 42.

The amplitude variation reducer 43 corrects amplitude variations of the normalized sine signal $\sin \theta'$ and the normalized cosine signal $\cos \theta'$ and outputs the corrected sine signal $\sin \theta_o$ and the corrected cosine signal $\cos \theta_o$.

Figure 22:
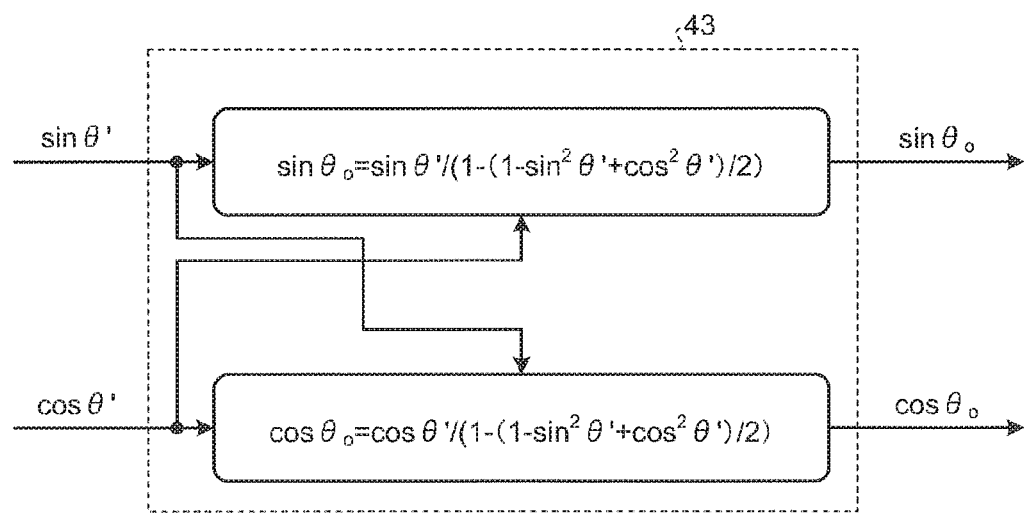
FIG. 22 is a diagram illustrating an example of a control block of an amplitude variation reducer according to the second embodiment.

FIG. 22 is a diagram illustrating an example of a control block of the amplitude variation reducer according to the second embodiment. The control block of the normalization processor 41 is the same as that of the first embodiment, and therefore description thereof will not be repeated.

The present embodiment assumes a case where the output amplitude of the magnetic sensor 3 varies. Such an assumption can be applied to cases including, for example, a case where an axial surface provided with the magnetic track 2 of the rotating body 100 is not smooth and a case where the axial distance between the magnetic sensor 3 and the magnetic track 2 varies during one turn of the rotating body 100, such as a case where the rotation axis X of the rotating body 100 is tilted.

The amplitude variation reducer 43 illustrated in FIG. 22 uses Expression (13) below to calculate the corrected sine signal $\sin \theta_o$. Hereinafter, Expression (13) below is also called a "first amplitude variation correction arithmetic expression".

$$\sin \theta_o = \sin \theta'/(1-(1-\sin^2 \theta'+\cos^2 \theta')/2) \quad (13)$$

For the amplitude variation reducer 43 illustrated in FIG. 22, Expression (13) above, that is, the first amplitude variation correction arithmetic expression is stored in the storage 10 and set as the magnetic sensor correction information in advance. The amplitude variation reducer 43 uses Expression (13) above, that is, the first amplitude variation correction arithmetic expression to calculate the corrected sine signal $\sin \theta_o$ by reducing the cyclic amplitude variation of the normalized sine signal $\sin \theta'$ and outputs the result.

The amplitude variation reducer 43 illustrated in FIG. 22 uses Expression (14) below to calculate the corrected cosine signal $\cos \theta_o$. Hereinafter, Expression (14) below is also called a "second amplitude variation correction arithmetic expression".

$$\cos \theta_o = \cos \theta'/(1-(1-\sin^2 \theta'+\cos^2 \theta')/2) \quad (14)$$

For the amplitude variation reducer 43 illustrated in FIG. 22, Expression (14) above, that is, the second amplitude variation correction arithmetic expression is stored in the storage 10 and set as the magnetic sensor correction information in advance. The amplitude variation reducer 43 uses Expression (14) above, that is, the second amplitude variation correction arithmetic expression to calculate the corrected cosine signal $\cos \theta_o$ by reducing the cyclic amplitude variation of the normalized cosine signal $\cos \theta'$ and outputs the result.

The first correction calculator 4A includes the amplitude variation reducer 43 and thus can correct the variation in the output amplitude of the first magnetic sensor 3A. The second correction calculator 4B includes the amplitude variation reducer 43 and thus can correct the variation in the output amplitude of the second magnetic sensor 3B.

As described above, for each of the correction calculators 4a (the first correction calculator 4A and the second correction calculator 4B), the first amplitude variation correction arithmetic expression and the second amplitude variation correction arithmetic expression are stored in advance as the first sensor correction information in the storage 10, and the amplitude variation reducer 43 uses the first amplitude variation correction arithmetic expression and the second amplitude variation correction arithmetic expression to correct the sine signal and the cosine signal. With this configuration, the variation in the output amplitude of the first magnetic sensor 3A (second magnetic sensor 3B) can be corrected.

The above-described configuration can improve the accuracy of position detection by the rotation angle detection device, and as a result, can contribute to an improvement in rotation control performance of various devices.

Third Embodiment

For example, a configuration, a rotating body, magnetic tracks, and an arrangement of a magnetic sensor module of a rotation angle detection device according to a third embodiment are the same as those of the first and second embodiments, and therefore description thereof will not be repeated. The same components as those described above in the first and second embodiments are denoted by the same reference signs, and the description thereof will not be repeated. In the following description, each of the first magnetic track 2A and the second magnetic track 2B is also called a "magnetic track 2"; each of the first magnetic sensor 3A and the second magnetic sensor 3B is also called a "magnetic sensor 3"; each of the first correction calculator 4A and the second correction calculator 4B is also called a "correction calculator 4b"; and each of the first magnetic sensor correction information and the second magnetic sensor correction information is also called "magnetic sensor correction information".

Figure 23:
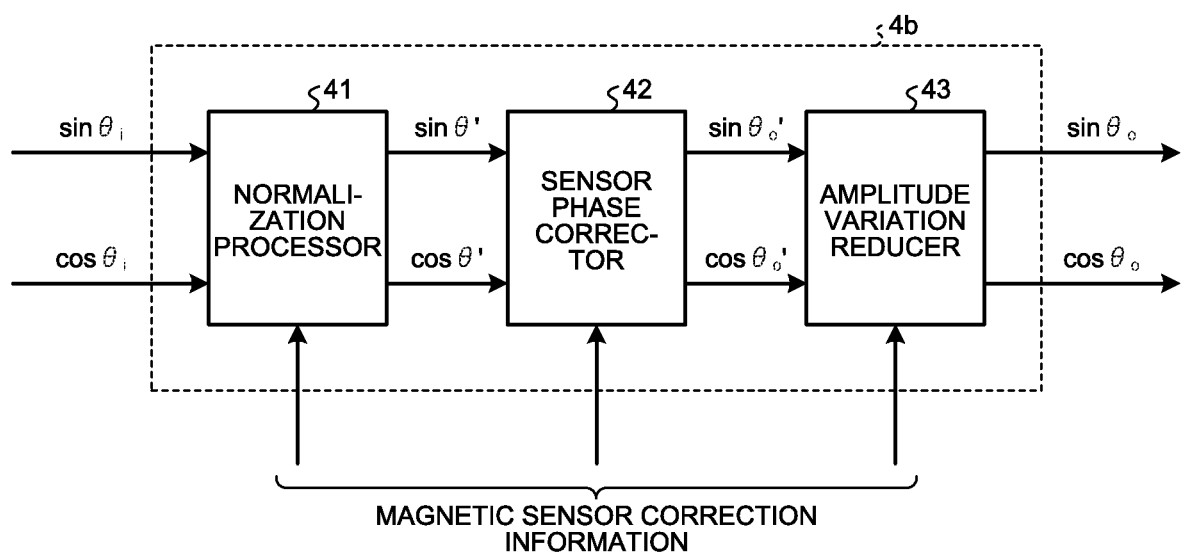
FIG. 23 is a diagram illustrating an example of functional blocks of a correction calculator according to a third embodiment.
Figure 24:
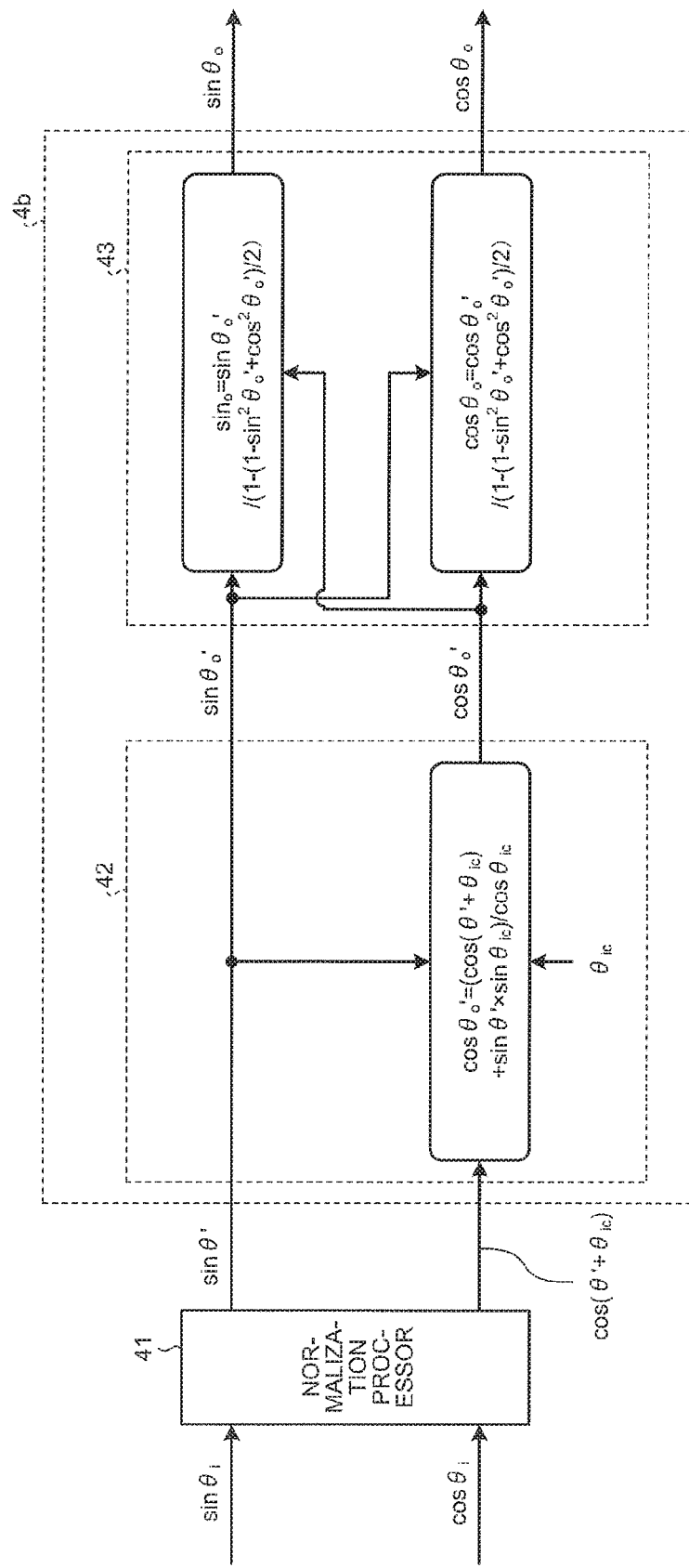
FIG. 24 is a diagram illustrating an example of the control block in which the correction calculator according to the third embodiment includes both the sensor phase corrector and the amplitude variation reducer.
Figure 25:
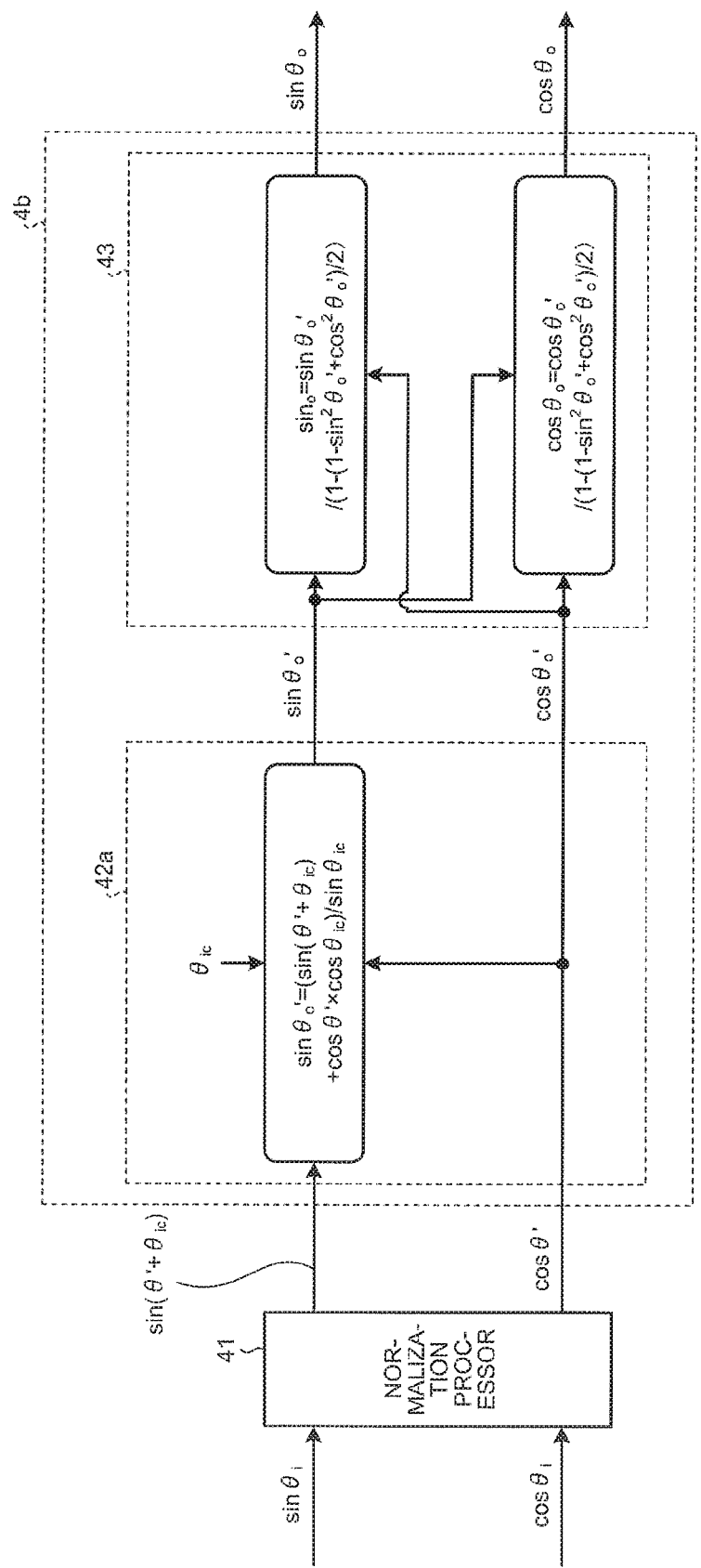
FIG. 25 is a diagram illustrating an example, different from that of FIG. 24, of the control block in which the correction calculator according to the third embodiment includes both the sensor phase corrector and the amplitude variation reducer.

FIG. 23 is a diagram illustrating an example of functional blocks of the correction calculator according to the third embodiment. FIG. 24 is a diagram illustrating an example of the control block in which the correction calculator according to the third embodiment includes both the sensor phase corrector and the amplitude variation reducer. FIG. 25 is a diagram illustrating an example, different from that of FIG. 24, of the control block in which the correction calculator according to the third embodiment includes both the sensor phase corrector and the amplitude variation reducer.

As illustrated in FIGS. 23 to 25, the correction calculator 4b according to the third embodiment includes the normalization processor 41 and the sensor phase corrector 42 (or the sensor phase corrector 42a) described in the first embodiment and the amplitude variation reducer 43 described in the second embodiment.

The correction calculator 4b receives the sine signal $\sin \theta_i$ and the cosine signal $\cos \theta_i$ output from the magnetic sensor 3. The correction calculator 4b acquires the magnetic sensor correction information to be applied to the normalization processor 41 and the amplitude variation reducer 43 from the storage 10.

The normalization processor 41 normalizes the sine signal $\sin \theta_i$ and the cosine signal $\cos \theta_i$ output from the magnetic sensor 3 and outputs the normalized sine signal $\sin \theta'$ and the normalized cosine signal $\cos \theta'$ to the sensor phase corrector 42 or 42a.

The sensor phase corrector 42 or 42a corrects the phase of the normalized sine signal $\sin \theta'$ or the normalized cosine signal $\cos \theta'$ and outputs a corrected sine signal $\sin \theta_o'$ and a corrected cosine signal $\cos \theta_o'$.

The sensor phase corrector 42 illustrated in FIG. 24 does not correct the normalized sine signal $\sin \theta'$ serving as the reference. In other words, the corrected sine signal $\sin \theta_o'$ in the sensor phase corrector 42 can be represented by Expression (15) below.

$$\sin \theta_o' = \sin \theta' \qquad (15)$$

The sensor phase corrector 42 illustrated in FIG. 24 uses Expression (16) below to calculate the corrected cosine signal $\cos \theta_o'$. Hereinafter, Expression (16) below is also called a "first phase correction arithmetic expression" in the same manner as Expression (10) above.

$$\cos \theta_o' = (\cos(\theta' + \theta_{ic}) + \sin \theta' \times \sin \theta_{ic}) / \cos \theta_{ic} \qquad (16)$$

For the sensor phase corrector 42 illustrated in FIG. 24, Expression (16) above, that is, the first phase correction arithmetic expression is stored in the storage 10 and set as the magnetic sensor correction information in advance. The sensor phase corrector 42 uses Expression (16) above, that is, the first phase correction arithmetic expression to calculate the corrected cosine signal $\cos \theta_o'$ by correcting the phase of the normalized cosine signal $\cos \theta'$ and outputs the result.

The amplitude variation reducer 43 corrects the amplitude variations of the corrected sine signal $\sin \theta_o'$ and the corrected cosine signal $\cos \theta_o'$ and outputs the corrected sine signal $\sin \theta_o$ and the corrected cosine signal $\cos \theta_o$.

Specifically, the amplitude variation reducer 43 illustrated in FIG. 24 uses Expression (17) below to calculate the corrected sine signal $\sin \theta_o$. Hereinafter, Expression (17) below is also called a "first amplitude variation correction arithmetic expression" in the same manner as Expression (13) above.

$$\sin \theta_o = \sin \theta_o' / (1 - (1 - \sin^2 \theta_o' + \cos^2 \theta_o') / 2) \qquad (17)$$

For the amplitude variation reducer 43 illustrated in FIG. 24, Expression (17) above, that is, the first amplitude variation correction arithmetic expression is stored in the storage 10 and set as the magnetic sensor correction information in advance. The amplitude variation reducer 43 uses Expression (17) above, that is, the first amplitude variation correction arithmetic expression to calculate the corrected sine signal $\sin \theta_o$ by reducing the cyclic amplitude variation of the corrected sine signal $\sin \theta_o'$ and outputs the result.

The amplitude variation reducer 43 illustrated in FIG. 24 uses Expression (18) below to calculate the corrected cosine signal $\cos \theta_o$. Hereinafter, Expression (18) below is also called a "second amplitude variation correction arithmetic expression" in the same manner as Expression (14) above.

$$\cos \theta_o = \cos \theta_o' / (1 - (1 - \sin^2 \theta_o' + \cos^2 \theta_o') / 2) \qquad (18)$$

For the amplitude variation reducer 43 illustrated in FIG. 24, Expression (18) above, that is, the second amplitude variation correction arithmetic expression is stored in the storage 10 and set as the magnetic sensor correction information in advance. The amplitude variation reducer 43 uses Expression (18) above, that is, the second amplitude variation correction arithmetic expression to calculate the corrected cosine signal $\cos \theta_o$ by reducing the cyclic amplitude variation of the corrected cosine signal $\cos \theta_o'$ and outputs the result.

The sensor phase corrector 42a illustrated in FIG. 25 uses Expression (19) below to calculate the corrected sine signal $\sin \theta_o'$. Hereinafter, Expression (19) below is also called a "second phase correction arithmetic expression" in the same manner as Expression (12) above.

$$\sin \theta_o' = (\sin(\theta' + \theta_{ic}) + \cos \theta' \times \cos \theta_{ic}) / \sin \theta_{ic} \qquad (19)$$

For the sensor phase corrector 42a illustrated in FIG. 25, Expression (19) above, that is, the second phase correction arithmetic expression is stored in the storage 10 and set as the magnetic sensor correction information in advance. The sensor phase corrector 42a uses Expression (19) above, that is, the second phase correction arithmetic expression to calculate the corrected sine signal $\sin \theta_o'$ by correcting the phase of the normalized sine signal $\sin \theta'$ and outputs the result.

The sensor phase corrector 42a illustrated in FIG. 25 does not correct the normalized cosine signal $\cos \theta'$ serving as the reference. In other words, the corrected cosine signal $\cos \theta_o'$ in the sensor phase corrector 42a can be represented by Expression (20) below.

$$\cos \theta_o' = \cos \theta' \qquad (20)$$

The amplitude variation reducer 43 corrects the amplitude variations of the corrected sine signal $\sin \theta_o'$ and the corrected cosine signal $\cos \theta_o'$ and outputs the corrected sine signal $\sin \theta_o$ and the corrected cosine signal $\cos \theta_o$.

Specifically, the amplitude variation reducer 43 illustrated in FIG. 25 uses Expression (21) below to calculate the corrected sine signal $\sin \theta_o$. Hereinafter, Expression (21) below is also called a "first amplitude variation correction arithmetic expression" in the same manner as Expressions (13) and (17) above.

$$\sin \theta_o = \sin \theta_o' / (1 - (1 - \sin^2 \theta_o' + \cos^2 \theta_o') / 2) \qquad (21)$$

For the amplitude variation reducer 43 illustrated in FIG. 25, Expression (21) above, that is, the first amplitude variation correction arithmetic expression is stored in the storage 10 and set as the magnetic sensor correction information in advance. The amplitude variation reducer 43 uses Expression (21) above, that is, the first amplitude variation correction arithmetic expression to calculate the corrected sine signal sin $\theta_o$ by reducing the cyclic amplitude variation of the corrected sine signal sin $\theta_o'$ and outputs the result.

The amplitude variation reducer 43 illustrated in FIG. 25 uses Expression (22) below to calculate the corrected cosine signal cos $\theta_o$. Hereinafter, Expression (22) below is also called a "second amplitude variation correction arithmetic expression" in the same manner as Expressions (14) and (18) above.

$$\cos \theta_o = \cos \theta_o'/(1-(1-\sin^2 \theta_o' + \cos^2 \theta_o')/2) \qquad (22)$$

For the amplitude variation reducer 43 illustrated in FIG. 25, Expression (22) above, that is, the second amplitude variation correction arithmetic expression is stored in the storage 10 and set as the magnetic sensor correction information in advance. The amplitude variation reducer 43 uses Expression (22) above, that is, the second amplitude variation correction arithmetic expression to calculate the corrected cosine signal cos $\theta_o$ by reducing the cyclic amplitude variation of the corrected cosine signal cos $\theta_o'$ and outputs the result.

With the configuration in which the first correction calculator 4A includes both the sensor phase corrector 42 or the sensor phase corrector 42a described in the first embodiment and the amplitude variation reducer 43 described in the second embodiment, the first correction calculator 4A can correct both the output phase and the variation in the output amplitude of the first magnetic sensor 3A. With the configuration in which the second correction calculator 4B includes both the sensor phase corrector 42 or the sensor phase corrector 42a described in the first embodiment and the amplitude variation reducer 43 described in the second embodiment, the second correction calculator 4B can correct both the output phase and the variation in the output amplitude of the second magnetic sensor 3B.

As described above, each of the correction calculators 4b (the first correction calculator 4A and the second correction calculator 4B) includes both the sensor phase corrector 42 or the sensor phase corrector 42a and the amplitude variation reducer 43. Therefore, both the output phase and the variation in the output amplitude of the first magnetic sensor 3A (second magnetic sensor 3B) can be corrected, and thus, the absolute angle of the rotating body 100 can be more accurately detected than in the first and second embodiments.

This configuration can more greatly improve the accuracy of position detection by the rotation angle detection device than in the first and second embodiments, and as a result, can more greatly contribute to the improvement in rotation control performance of various devices than in the first and second embodiments.

Fourth Embodiment

Figure 26:
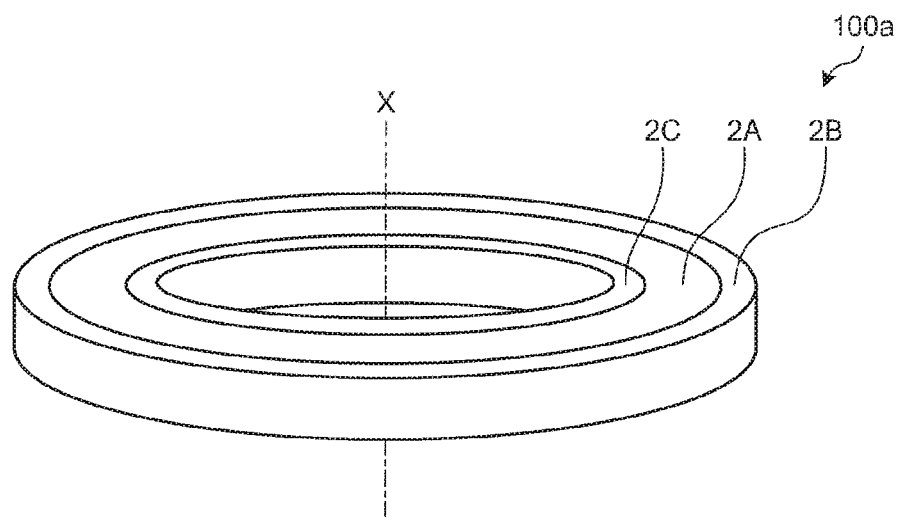
FIG. 26 is a diagram illustrating an example of a rotating body of a rotation angle detection device according to a fourth embodiment.
Figure 27:
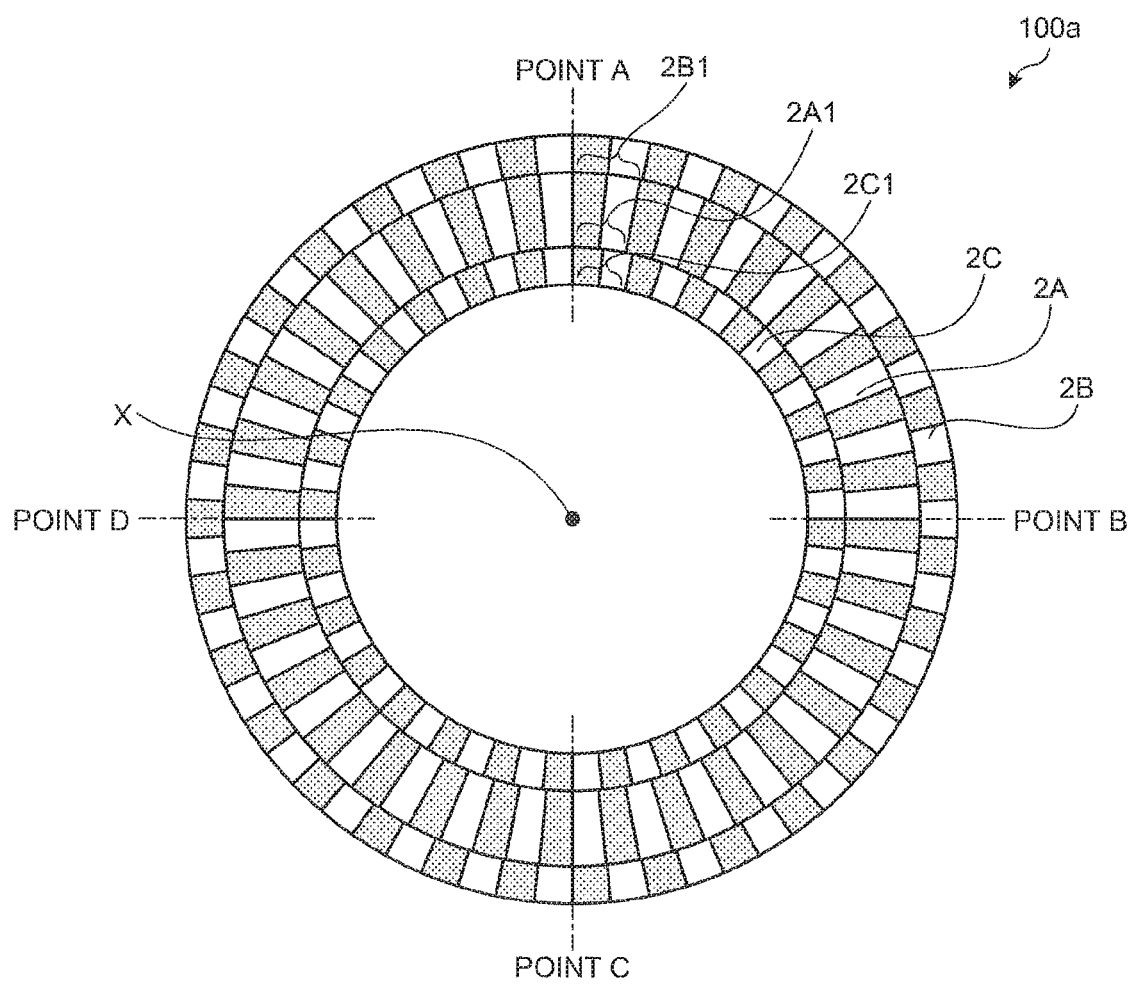
FIG. 27 is a diagram illustrating an example of magnetic tracks of the rotating body illustrated in FIG. 26.
Figure 28:
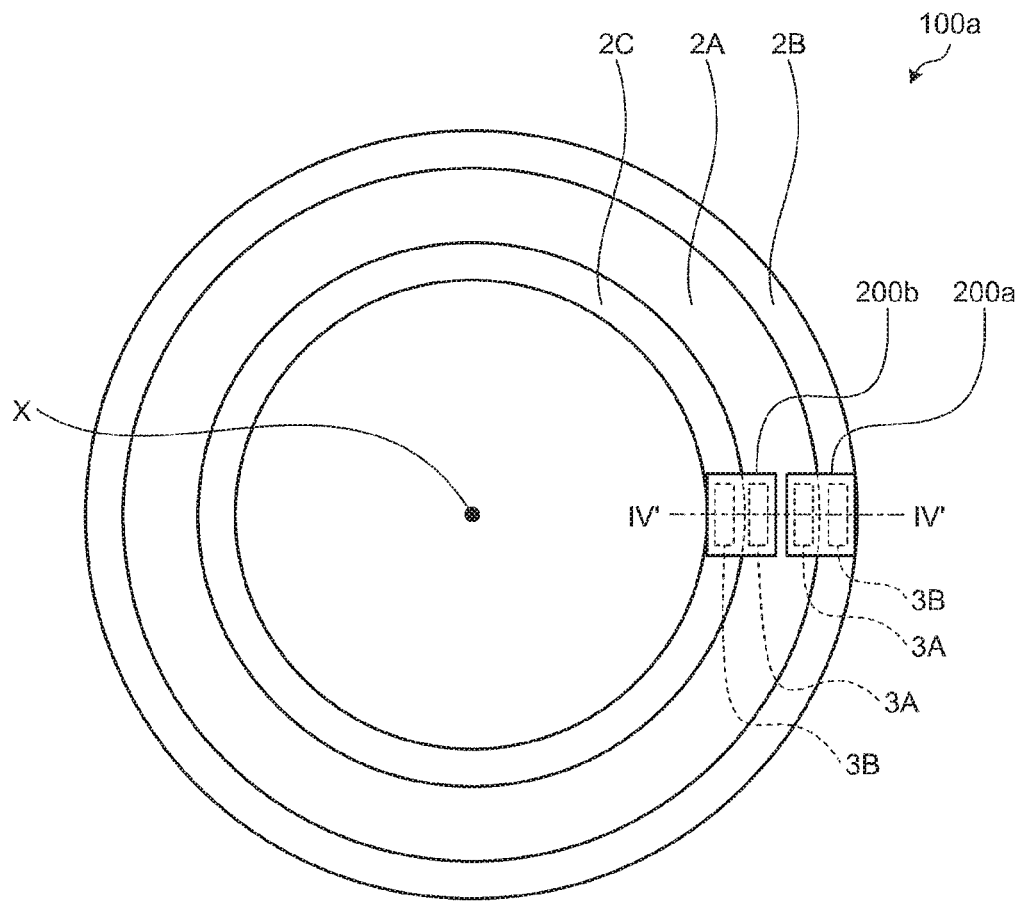
FIG. 28 is a diagram illustrating an arrangement example of magnetic sensor modules of the rotation angle detection device according to the fourth embodiment.
Figure 29:
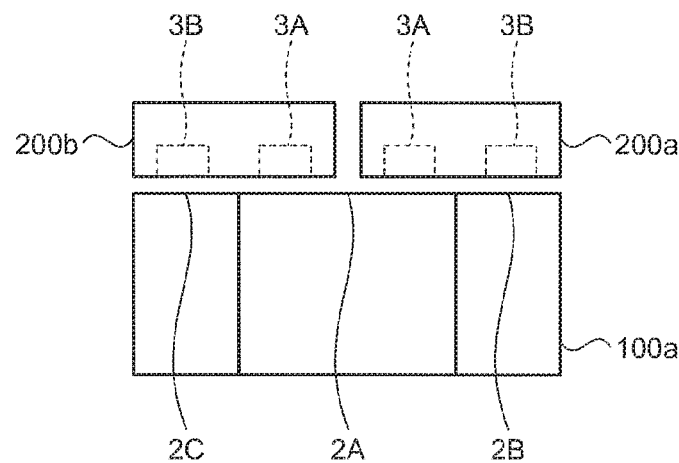
FIG. 29 is a sectional view, along IV'-IV' illustrated in FIG. 28, of the rotation angle detection device according to the fourth embodiment.

FIG. 26 is a diagram illustrating an example of a rotating body of a rotation angle detection device according to a fourth embodiment. FIG. 27 is a diagram illustrating an example of magnetic tracks of the rotating body illustrated in FIG. 26. FIG. 28 is a diagram illustrating an arrangement example of magnetic sensor modules of the rotation angle detection device according to the fourth embodiment. FIG. 29 is a sectional view, along IV'-IV' illustrated in FIG. 28, of the rotation angle detection device according to the fourth embodiment.

As illustrated in FIGS. 26 and 27, a rotating body 100a of a rotation angle detection device 1a according to the fourth embodiment has a third magnetic track 2C along which magnetic pole pairs 2C1 arranged at even intervals, in addition to the configuration of the first embodiment.

In the example illustrated in FIG. 27, the third magnetic track 2C includes 28 pairs of the magnetic pole pairs 2C1.

The present embodiment has an axial configuration in which the first magnetic track 2A, the second magnetic track 2B, and the third magnetic track 2C are provided on one end face in the axial direction of the rotating body 100a, but is not limited to this configuration, and may have a radial configuration in which the first magnetic track 2A, the second magnetic track 2B, and the third magnetic track 2C are provided, for example, so as to be arranged in the axial direction on the outer circumferential surface of the rotating body 100a.

As illustrated in FIGS. 28 and 29, in the fourth embodiment, two modules of a first magnetic sensor module 200a and a second magnetic sensor module 200b are provided so as to be arranged in the radial direction of the rotating body 100a. These two modules of the first magnetic sensor module 200a and the second magnetic sensor module 200b each have substantially the same configuration and function as those of the magnetic sensor module 200 described in the first, second, and third embodiments.

The first magnetic sensor module 200a and the second magnetic sensor module 200b are each provided so as to be opposed in the axial direction to the rotating body 100a that has the first magnetic track 2A, the second magnetic track 2B, and the third magnetic track 2C, with a gap therebetween.

More specifically, the first magnetic sensor 3A of the first magnetic sensor module 200a is opposed to the first magnetic track 2A and detects a magnetic field of the first magnetic track 2A. The second magnetic sensor 3B of the first magnetic sensor module 200a is opposed to the second magnetic track 2B and detects the magnetic field of the second magnetic track 2B. The first magnetic sensor 3A of the second magnetic sensor module 200b is opposed to the first magnetic track 2A and detects a magnetic field of the first magnetic track 2A. The second magnetic sensor 3B of the second magnetic sensor module 200b is opposed to the third magnetic track 2C and detects a magnetic field of the third magnetic track 2C.

The first magnetic sensor module 200a and the second magnetic sensor module 200b are provided at fixed places that do not rotate in synchronization with the rotating body 100a.

In the example illustrated in FIG. 27, the number of the magnetic pole pairs 2A1 on the first magnetic track 2A is 32 (P=32, where P is a natural number) while the number of the magnetic pole pairs 2B1 on the second magnetic track 2B is 31 (P−1=31), and the magnetic pole phase of the first magnetic track 2A coincides with the magnetic pole phase of the second magnetic track 2B at point A. In other words, the first magnetic sensor module 200a can detect the absolute angle in the entire circumference of the rotating body 100a with respect to point A serving as the origin position where the phase of the detection signal of the first magnetic sensor 3A coincides with the phase of the detection signal of the second magnetic sensor 3B.

The relation between the number of the magnetic pole pairs 2A1 on the first magnetic track 2A and the number of the magnetic pole pairs 2B1 on the second magnetic track 2B is not limited to that described above. For example, the configuration may be such that the number of the magnetic pole pairs 2B1 on the second magnetic track 2B is P+1 when the number of the magnetic pole pairs 2A1 on the first magnetic track 2A is P.

In the example illustrated in FIG. 27, the number of the magnetic pole pairs 2A1 on the first magnetic track 2A is 32 (=4×8) while the number of the magnetic pole pairs 2C1 on the third magnetic track 2C is 28 (=4×7), and the magnetic pole phase of the first magnetic track 2A coincides with the magnetic pole phase of the third magnetic track 2C at each point of point A, point B, point C, and point D that divide the rotating body 100a in the circumferential direction thereof into four equal parts. In other words, the second magnetic sensor module 200b can detect the absolute angle in each segment obtained by dividing the entire circumference of the rotating body 100a into the four equal parts with respect to a corresponding one of point A, point B, point C, and point D serving as an origin position where the phase of the detection signal of the first magnetic sensor 3A coincides with the phase of the detection signal of the second magnetic sensor 3B.

The relation between the number of the magnetic pole pairs 2A1 on the first magnetic track 2A and the number of the magnetic pole pairs 2C1 on the third magnetic track 2C, illustrated in FIG. 27, is generalized as follows: when the second magnetic sensor module 200b is configured such that the number of the magnetic pole pairs 2A1 on the first magnetic track 2A is n×Q (where n and Q are natural numbers) while the number of the magnetic pole pairs 201 on the third magnetic track 2C is n×(Q−1), and the magnetic pole phase of the first magnetic track 2A coincides with the magnetic pole phase of the third magnetic track 2C at all points that divide the rotating body 100a in the circumferential direction thereof into n equal parts, the second magnetic sensor module 200b can detect the absolute angle in each segment obtained by dividing the entire circumference of the rotating body 100a into the n equal parts with respect to a corresponding one of the points serving as an origin position where the phase of the detection signal of the first magnetic sensor 3A coincides with the phase of the detection signal of the second magnetic sensor 3B.

The relation between the number of the magnetic pole pairs 2A1 on the first magnetic track 2A and the number of the magnetic pole pairs 2C1 on the third magnetic track 2C is not limited to that described above. For example, the configuration may be such that the number of the magnetic pole pairs 2C1 on the third magnetic track 2C is n×(Q+1) when the number of the magnetic pole pairs 2A1 on the first magnetic track 2A is n×Q.

In this manner, reliability in the detection of the absolute angle of the rotating body 100a can be increased by adding the configuration of detecting the absolute angle in each segment obtained by dividing the entire circumference of the rotating body 100a into the n equal parts to the configuration of detecting the absolute angle in the entire circumference of the rotating body 100a.

As described above, the rotation angle detection device 1a according to the fourth embodiment further includes the third magnetic track 2C having the axis center at the rotation axis X; when the number of the magnetic pole pairs 2A1 on the first magnetic track 2A is set to n×Q (where n and Q are natural numbers), the number of the magnetic pole pairs 2C1 on the third magnetic track 2C is set to n×(Q−1) or n×(Q+1); and the rotation angle detection device 1a includes the first magnetic sensor module 200a that detects the magnetic field of the first magnetic track 2A and the magnetic field of the second magnetic track 2B to detect the absolute angle in the entire circumference of the rotating body 100a and the second magnetic sensor module 200b that detects the magnetic field of the first magnetic track 2A and the magnetic field of the third magnetic track 2C to detect the absolute angle in each segment obtained by dividing the entire circumference of the rotating body 100a into the n equal parts.

This configuration can increase the reliability in the detection of the absolute angle of the rotating body 100a.

When the first magnetic sensor module 200a and the second magnetic sensor module 200b each have a configuration including the correction calculator 4, 4a, or 4b (the first correction calculator 4A and the second correction calculator 4B) in the same manner as in the first, second, and third embodiments, the absolute angle of the rotating body 100a can be accurately detected.

The above-described configuration can improve the accuracy of position detection by the rotation angle detection device, and as a result, can contribute to an improvement in rotation control performance of various devices.

Fifth Embodiment

Figure 30:
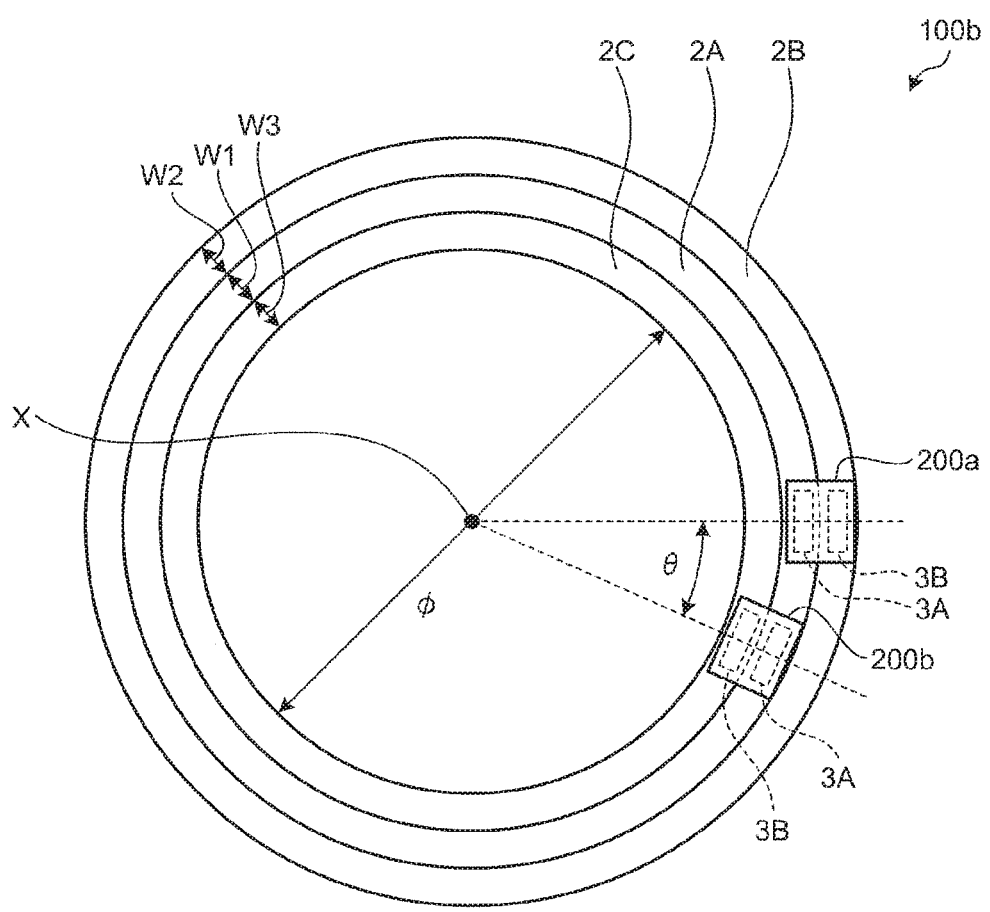
FIG. 30 is a diagram illustrating an arrangement example of the magnetic sensor modules of a rotation angle detection device according to a fifth embodiment.

FIG. 30 is a diagram illustrating an arrangement example of the magnetic sensor modules of a rotation angle detection device according to a fifth embodiment.

In the present embodiment, a rotating body 100b of a rotation angle detection device 1b according to the fifth embodiment has the first magnetic track 2A, the second magnetic track 2B, and the third magnetic track 2C, in the same manner as the rotating body 100a of the rotation angle detection device 1a according to the fourth embodiment.

In the present embodiment, the number of the magnetic pole pairs on the first magnetic track 2A, the number of the magnetic pole pairs on the second magnetic track 2B, and the number of the magnetic pole pairs on the third magnetic track 2C are the same as those of the fourth embodiment.

In other words, in the same manner as in the fourth embodiment, the first magnetic sensor module 200a can detect the absolute angle in the entire circumference of the rotating body 100b with respect to point A serving as the origin position where the phase of the detection signal of the first magnetic sensor 3A coincides with the phase of the detection signal of the second magnetic sensor 3B (refer to FIG. 27).

In the same manner as in the fourth embodiment, the relation between the number of the magnetic pole pairs 2A1 on the first magnetic track 2A and the number of the magnetic pole pairs 2C1 on the third magnetic track 2C is generalized as follows: in the configuration in which the number of the magnetic pole pairs 2A1 on the first magnetic track 2A is n×Q (where n and Q are natural numbers) while the number of the magnetic pole pairs 2C1 on the third magnetic track 2C is n×(Q−1), and the magnetic pole phase of the first magnetic track 2A coincides with the magnetic pole phase of the third magnetic track 2C at all points that divide the rotating body 100a in the circumferential direction thereof into n equal parts, the second magnetic sensor module 200b can detect the absolute angle in each segment obtained by dividing the entire circumference of the rotating body 100b into the n equal parts with respect to a corresponding one of the points serving as an origin position where the phase of the detection signal of the first magnetic sensor 3A coincides with the phase of the detection signal of the second magnetic sensor 3B.

In the same manner as in the fourth embodiment, the relation between the number of the magnetic pole pairs 2A1 on the first magnetic track 2A and the number of the magnetic pole pairs 2C1 on the third magnetic track 2C is also not limited to that described above. For example, the configuration may be such that the number of the magnetic pole pairs 2C1 on the third magnetic track 2C is n×(Q+1) when the number of the magnetic pole pairs 2A1 on the first magnetic track 2A is n×Q.

In the fourth embodiment, the example has been described in which the first magnetic sensor module 200a and the second magnetic sensor module 200b are provided so as to be arranged in the radial direction of the rotating body 100a (refer to FIG. 28). In this case, the first magnetic sensor 3A of the first magnetic sensor module 200a and the first magnetic sensor 3A of the second magnetic sensor module 200b that detect the magnetic field of the first magnetic track 2A are arranged in the radial direction of the rotating body 100a. Therefore, the width in the radial direction of the first magnetic track 2A needs to be greater than the width in the radial direction of each of the second magnetic track 2B and the third magnetic track 2C.

In the present embodiment, as illustrated in FIG. 30, the first magnetic sensor module 200a and the second magnetic sensor module 200b are arranged so as to be shifted from each other by an angle θ in the circumferential direction of the rotating body 100b. With this arrangement, the first magnetic sensor 3A of the first magnetic sensor module 200a and the first magnetic sensor 3A of the second magnetic sensor module 200b are arranged in the circumferential direction of the rotating body 100b. Therefore, a width W1 in the radial direction of the first magnetic track 2A can be less than that of the fourth embodiment. Specifically, the width W1 in the radial direction of the first magnetic track 2A can be, for example, equal to a width W2 in the radial direction of the second magnetic track 2B and a width W3 in the radial direction of the third magnetic track 2C (W1≈W2≈W3). As a result, a diameter Φ of a hollow hole of the rotating body 100b can be greater than that of the fourth embodiment. This configuration can provide a higher degree of freedom of designing the device to which the rotation angle detection device 1b according to the fifth embodiment is applied than in the case of the fourth embodiment.

As described above, in the rotation angle detection device 1b according to the fifth embodiment, the first magnetic sensor module 200a and the second magnetic sensor module 200b are arranged so as to be shifted from each other by the angle θ in the circumferential direction of the rotating body 100b. With this configuration, the width W1 in the radial direction of the first magnetic track 2A can be less than that of the fourth embodiment. This, in turn, can make the diameter Φ of the hollow hole of the rotating body 100b greater than that of the fourth embodiment, and can provide a higher degree of freedom of designing the device to which the rotation angle detection device 1b according to the fifth embodiment is applied than in the case of the fourth embodiment.

The following describes modifications of the magnetic sensor module of the rotation angle detection device. In the following description, the same components as those described above in any one of the first to third embodiments are denoted by the same reference signs, or are not denoted by any reference sign and will not be described again.

Figure 31:
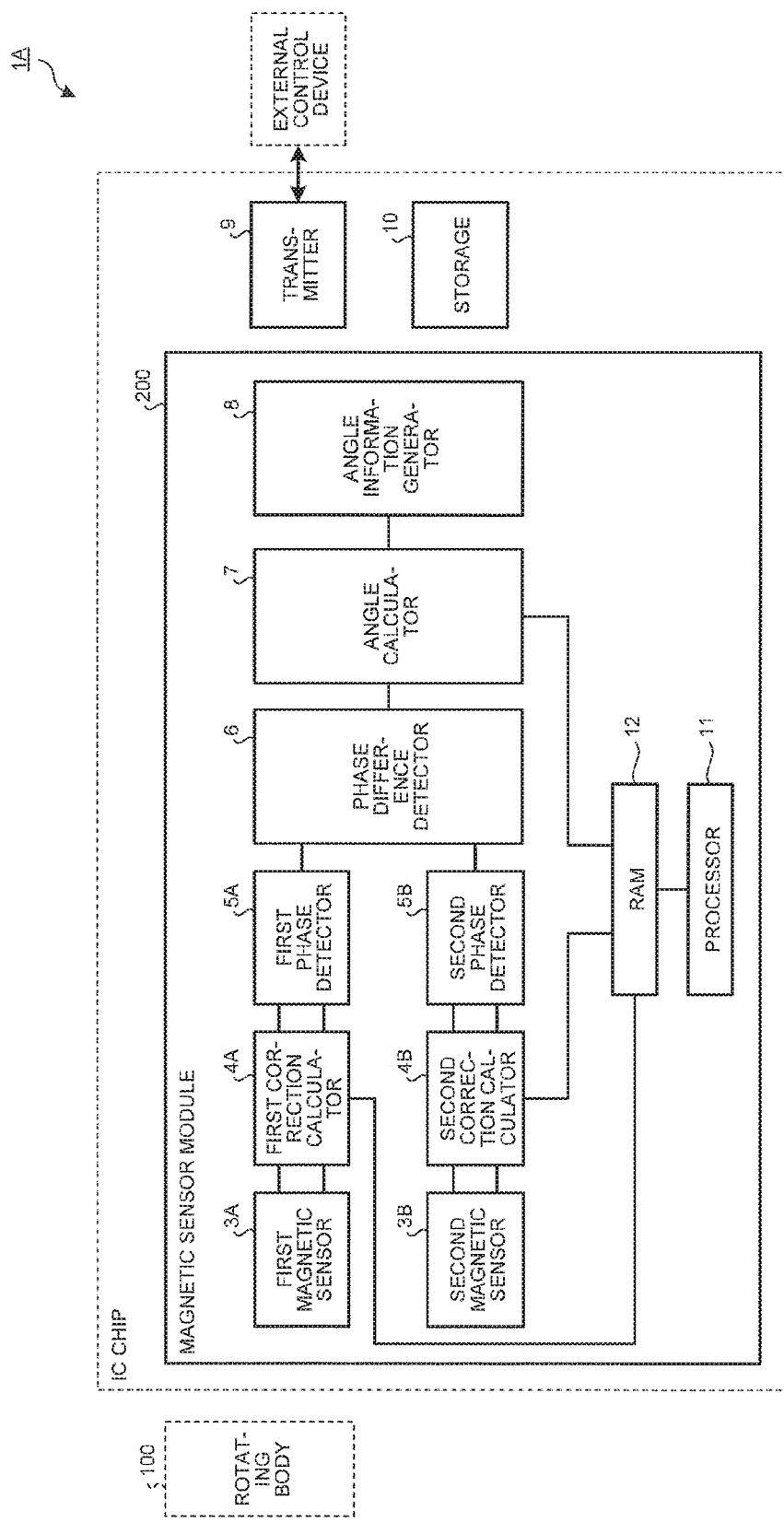
FIG. 31 is a diagram illustrating a first modification of the magnetic sensor module.

FIG. 31 is a diagram illustrating a first modification of the magnetic sensor module. The rotation angle detection device 1 illustrated in FIG. 1 is exemplified to include the magnetic sensor module 200 integrated into the IC chip, and the transmitter 9 and the storage 10 provided outside the IC chip. In contrast, a rotation angle detection device 1A illustrated in FIG. 31 represents an example in which the magnetic sensor module 200, the transmitter 9, and the storage 10 are integrated into one IC chip.

Specifically, the magnetic sensor module 200 includes the first magnetic sensor 3A, the first correction calculator 4A, the first phase detector 5A, the second magnetic sensor 3B, the second correction calculator 4B, the second phase detector 5B, the phase difference detector 6, the angle calculator 7, the angle information generator 8, a processor 11, and a random access memory (RAM) 12.

After a power supply is turned on, the processor 11 reads various types of information from the storage 10 and stores the various types of information thus read in the RAM 12. The various types of information is information required to operate the rotation angle detection device 1, including, for example, the calculation parameter used by the angle calculator 7, the number (P) of the magnetic pole pairs 2A1 on the first magnetic track 2A, the number (P+1) of the magnetic pole pairs 2B1 on the second magnetic track 2B, the first magnetic sensor correction information used by the first correction calculator 4A, the second magnetic sensor correction information used by the second correction calculator 4B, and the reference position of the absolute angle.

The angle calculator 7 reads, for example, the calculation parameter from the RAM 12. The first correction calculator 4A reads, for example, the first magnetic sensor correction information from the RAM 12. The second correction calculator 4B reads, for example, the second magnetic sensor correction information from the RAM 12. Accordingly, the magnetic sensor module 200 has a shorter access distance from the angle calculator 7, the first correction calculator 4A, and the second correction calculator 4B, and can more quickly read and write the information.

Figure 32:
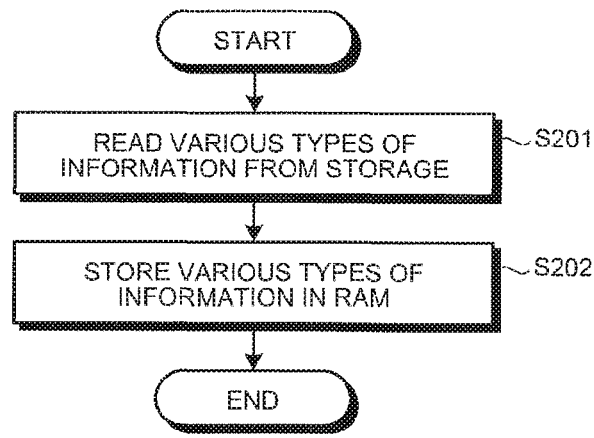

The following describes operations after the power supply has been turned on in the magnetic sensor module 200. FIG. 32 is a flowchart for describing the operations of the magnetic sensor module 200 after the power supply has been turned on.

At Step S201 after the power supply has been turned on, the processor 11 accesses the storage 10 to read the various types of information from the storage 10.

At Step S202, the processor 11 stores the various types of information thus read in the RAM 12.

Figure 33:
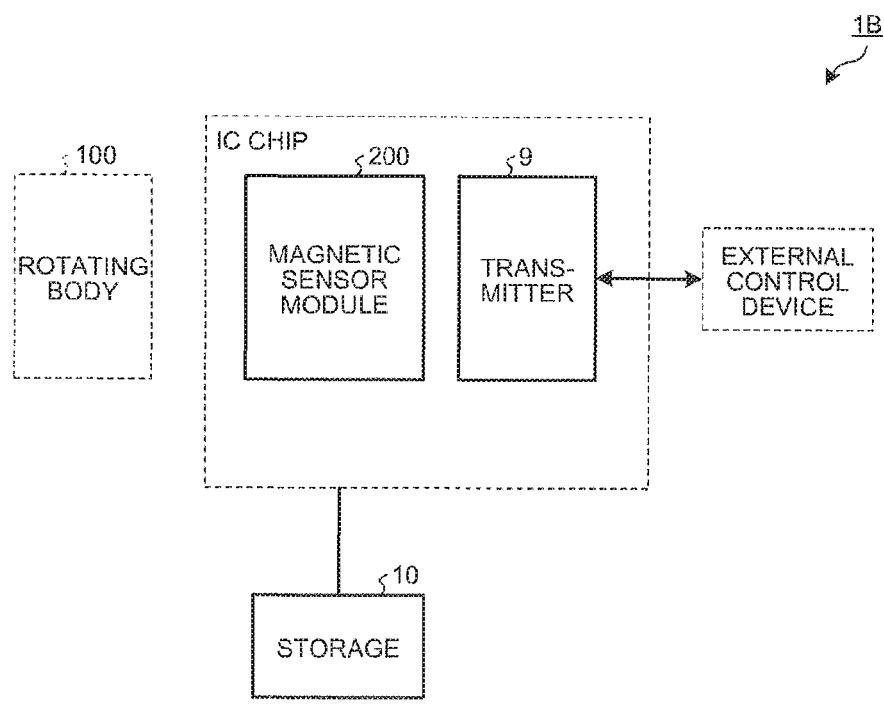
FIG. 33 is a diagram illustrating a second modification of the magnetic sensor module.

FIG. 33 is a diagram illustrating a second modification of the magnetic sensor module. A rotation angle detection device 1B illustrated in FIG. 33 represents an example in which the magnetic sensor module 200 and the transmitter 9 are integrated into one IC chip.

Figure 34:
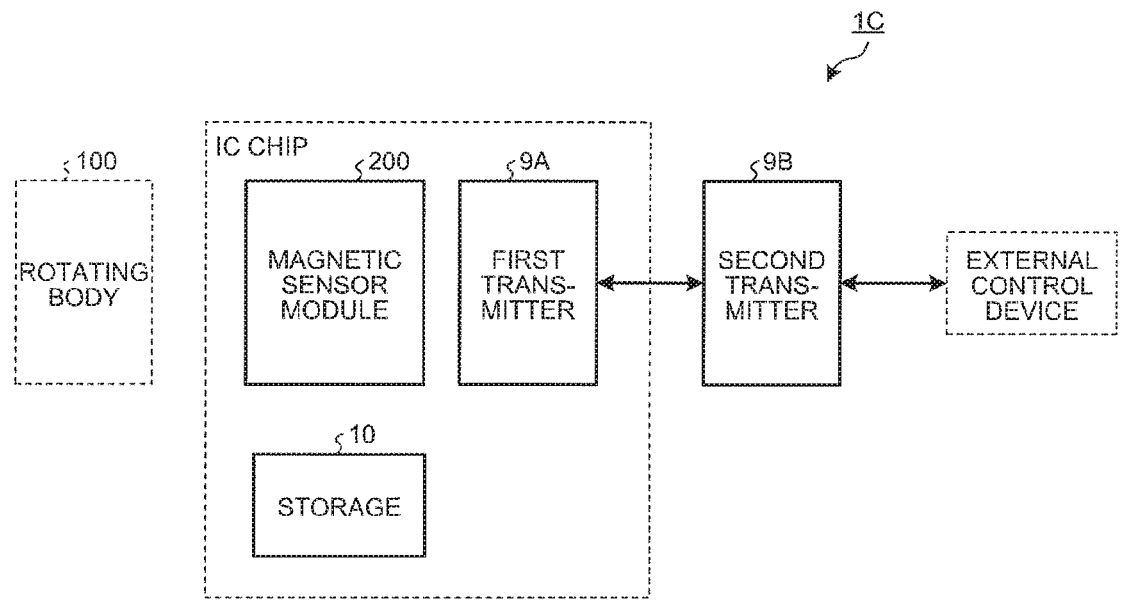
FIG. 34 is a diagram illustrating a third modification of the magnetic sensor module.
Figure 35:
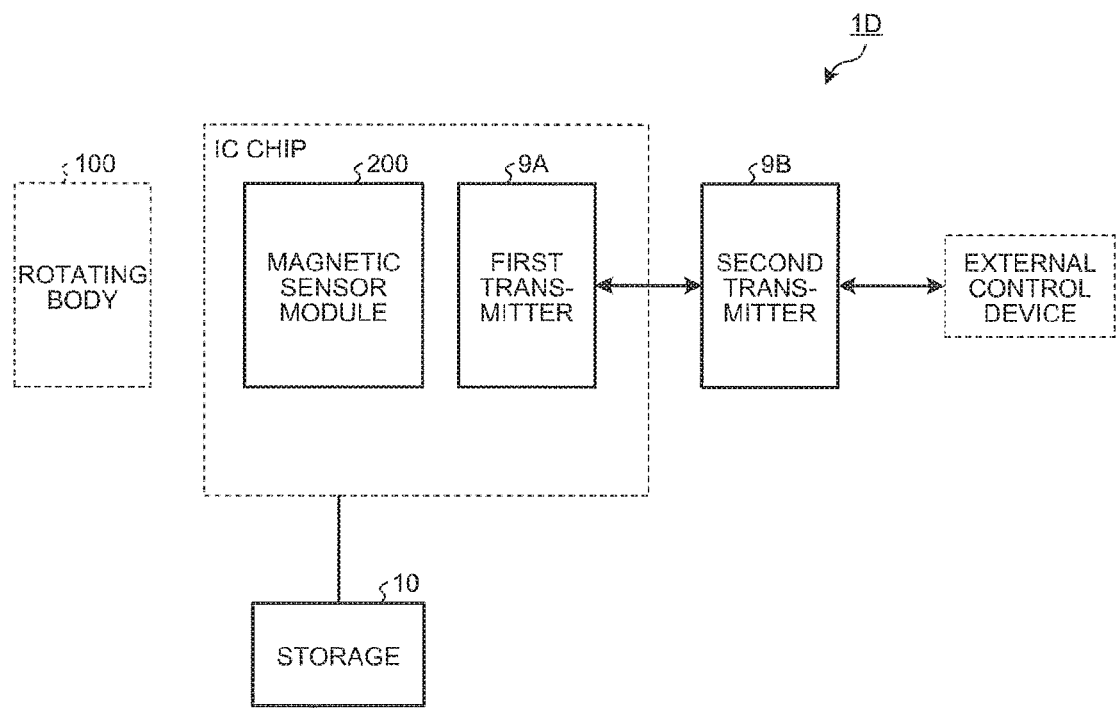
FIG. 35 is a diagram illustrating a fourth modification of the magnetic sensor module.

FIG. 34 is a diagram illustrating a third modification of the magnetic sensor module. FIG. 35 is a diagram illustrating a fourth modification of the magnetic sensor module. A rotation angle detection device 1C illustrated in FIG. 34 and a rotation angle detection device 1D illustrated in FIG. 35 represent examples each including a first transmitter 9A that converts the absolute angle information generated by the angle information generator 8 into an appropriate signal (for example, a phase ABZ signal, a parallel signal, serial data, an analog voltage, or a PWM signal) and outputs the result, and a second transmitter 9B that converts the appropriate signal output from the first transmitter 9A into an appropriate protocol recognizable by the external control device.

The rotation angle detection device 1C illustrated in FIG. 34 represents an example in which the magnetic sensor module 200, the first transmitter 9A, and the storage 10 are integrated into one IC chip.

The rotation angle detection device 1D illustrated in FIG. 35 represents an example in which the magnetic sensor module 200 and the first transmitter 9A are integrated into one IC chip.

The integration into one IC chip may be made in any one of the aspects illustrated in FIGS. 1 and 31 to 35.

The invention claimed is:

1. A rotation angle detection device comprising:
    a rotating body having a plurality of magnetic tracks on which magnetic pole pairs each including a north pole and a south pole are arranged at even intervals in concentric ring shapes, the magnetic tracks being different from each other in number of the magnetic pole pairs arranged thereon;
    a plurality of magnetic sensors each configured to detect a magnetic field of a corresponding one of the magnetic tracks and output a sine signal and a cosine signal;
    storage configured to store magnetic sensor correction information that is preset such that a value of the sine signal output by each of the magnetic sensors corresponding to a rotation angle of the rotating body comes closer to a value of a reference sine signal of the magnetic sensor, or such that a value of the cosine signal output by the magnetic sensor corresponding to the rotation angle of the rotating body comes closer to a value of a reference cosine signal of the magnetic sensor;
    a correction calculator configured to correct the sine signal and the cosine signal to a corrected sine signal and a corrected cosine signal based on the magnetic sensor correction information;
    a phase detector configured to calculate a phase of the corrected sine signal and the corrected cosine signal;
    a phase difference detector configured to calculate a phase difference between a plurality of the phases; and
    an angle calculator configured to convert the phase difference into an absolute angle, wherein
    V sin ave denotes an average value of the sine signal; V cos ave denotes an average value of the cosine signal; V sin max denotes a maximum value of the sine signal; V sin min denotes a minimum value of the sine signal; V cos max denotes a maximum value of the cosine signal; V cos min denotes a minimum value of the cosine signal; $\sin \theta_i$ and $\cos \theta_i$ denote input signal values; $\sin \theta'$ and $\cos \theta'$ denote output signal values; and the value V sin ave, the value V cos ave, the value V sin max, the value V sin min, the value V cos max, and the value V cos min are stored as the magnetic sensor correction information in the storage,
    the correction calculator is configured to use Expressions (5) and (7) below to calculate the value $\sin \theta'$ and use Expressions (6) and (8) below to calculate the value $\cos \theta'$,
    $\theta_{ic}$ denotes a sensor phase error between an output phase of the sine signal and an output phase of the cosine signal; $\sin \theta'$ and $\cos (\theta'+\theta_{ic})$ denote input signal values; $\sin \theta_o$ and $\cos \theta_o$ denote output signal values; and the error $\theta_{ic}$ is stored as the magnetic sensor correction information in the storage, and
    the correction calculator is configured to use Expressions (15) and (17) below to calculate the value $\sin \theta_o$ and use Expressions (16) and (18) below to calculate the value $\cos \theta_o$, $$\sin \theta''=\sin \theta_i-V \sin \text{ave} \quad (5)$$

$$\cos \theta''=\cos \theta_i-V \cos \text{ave} \quad (6)$$

$$\sin \theta'=\sin \theta''/(|V \sin \max - V \sin \min|/2) \quad (7)$$

$$\cos \theta'=\cos \theta''/(|V \cos \max - V \cos \min|/2) \quad (8)$$

$$\sin \theta_o'=\sin \theta' \quad (15)$$

$$\cos \theta_o'=(\cos(\theta'+\theta_{ic})+\sin \theta' \times \sin \theta_{ic})/\cos \theta_{ic} \quad (16)$$

$$\sin \theta_o=\sin \theta_o'/(1-(1-\sin^2 \theta_o'+\cos^2 \theta_o')/2) \quad (17)$$

$$\cos \theta_o=\cos \theta_o'/(1-(1-\sin^2 \theta_o'+\cos^2 \theta_o')/2) \quad (18).$$

2. The rotation angle detection device according to claim 1, wherein the magnetic tracks are magnetized on one end face in an axial direction of the rotating body.

3. The rotation angle detection device according to claim 1, wherein
    the magnetic tracks comprise:
        a first magnetic track;
        a second magnetic track provided at an outer circumference of the first magnetic track; and
        a third magnetic track provided at an inner circumference of the first magnetic track, and
    the rotation angle detection device further comprises:
        a first magnetic sensor module comprising the magnetic sensor that is configured to detect the magnetic field of the first magnetic track and the magnetic sensor that is configured to detect the magnetic field of the second magnetic track; and
        a second magnetic sensor module comprising the magnetic sensor that is configured to detect the magnetic field of the first magnetic track and the magnetic sensor that is configured to detect the magnetic field of the third magnetic track.

4. The rotation angle detection device according to claim 3, wherein the first magnetic sensor module and the second magnetic sensor module are arranged so as to be shifted from each other in a circumferential direction of the rotating body.

5. A rotation angle detection device comprising:
    a rotating body having a plurality of magnetic tracks on which magnetic pole pairs each including a north pole and a south pole are arranged at even intervals in concentric ring shapes, the magnetic tracks being different from each other in number of the magnetic pole pairs arranged thereon;
    a plurality of magnetic sensors each configured to detect a magnetic field of a corresponding one of the magnetic tracks and output a sine signal and a cosine signal;
    storage configured to store magnetic sensor correction information that is preset such that a value of the sine signal output by each of the magnetic sensors corresponding to a rotation angle of the rotating body comes closer to a value of a reference sine signal of the magnetic sensor, or such that a value of the cosine signal output by the magnetic sensor corresponding to the rotation angle of the rotating body comes closer to a value of a reference cosine signal of the magnetic sensor;
    a correction calculator configured to correct the sine signal and the cosine signal to a corrected sine signal and a corrected cosine signal based on the magnetic sensor correction information;
    a phase detector configured to calculate a phase of the corrected sine signal and the corrected cosine signal;
    a phase difference detector configured to calculate a phase difference between a plurality of the phases; and
    an angle calculator configured to convert the phase difference into an absolute angle, wherein
    V sin ave denotes an average value of the sine signal; V cos ave denotes an average value of the cosine signal; V sin max denotes a maximum value of the sine signal;

V sin min denotes a minimum value of the sine signal; V cos max denotes a maximum value of the cosine signal; V cos min denotes a minimum value of the cosine signal; $\sin \theta_i$ and $\cos \theta_i$ denote input signal values; $\sin \theta'$ and $\cos \theta'$ denote output signal values; and the value V sin ave, the value V cos ave, the value V sin max, the value V sin min, the value V cos max, and the value V cos min are stored as the magnetic sensor correction information in the storage, the correction calculator is configured to use Expressions (5) and (7) below to calculate the value $\sin \theta'$ and use Expressions (6) and (8) below to calculate the value $\cos \theta'$, $\theta_{ic}$ denotes a sensor phase error between an output phase of the sine signal and an output phase of the cosine signal; $\sin(\theta'+\theta_{ic})$ and $\cos \theta'$ denote input signal values; $\sin \theta_o$ and $\cos \theta_o$ denote output signal values; and the error $\theta_{ic}$ is stored as the magnetic sensor correction information in the storage, and the correction calculator is configured to use Expressions (19) and (21) below to calculate the value $\sin \theta_o$ and use Expressions (20) and (22) below to calculate the value $\cos \theta_o$, $$\sin \theta''=\sin \theta_i - V \sin ave \qquad (5)$$

$$\cos \theta''=\cos \theta_i - V \cos ave \qquad (6)$$

$$\sin \theta' = \sin \theta''/(|V \sin max - V \sin min|/2) \qquad (7)$$

$$\cos \theta' = \cos \theta''/(|V \cos max - V \cos min|/2) \qquad (8)$$

$$\sin \theta_o' = (\sin(\theta'+\theta_{ic}) + \cos \theta' \times \cos \theta_{ic})/\sin \theta_{ic} \qquad (19)$$

$$\cos \theta_o' = \cos \theta' \qquad (20)$$

$$\sin \theta_o = \sin \theta_o'/(1-(1-\sin^2 \theta_o' + \cos^2 \theta_o')/2) \qquad (21)$$

$$\cos \theta_o = \cos \theta_o'/(1-(1-\sin^2 \theta_o' + \cos^2 \theta_o')/2) \qquad (22).$$

6. The rotation angle detection device according to claim 5, wherein the magnetic tracks are magnetized on one end face in an axial direction of the rotating body.

7. The rotation angle detection device according to claim 5, wherein the magnetic tracks comprise:
- a first magnetic track;
- a second magnetic track provided at an outer circumference of the first magnetic track; and
- a third magnetic track provided at an inner circumference of the first magnetic track, and the rotation angle detection device further comprises:
- a first magnetic sensor module comprising the magnetic sensor that is configured to detect the magnetic field of the first magnetic track and the magnetic sensor that is configured to detect the magnetic field of the second magnetic track; and
- a second magnetic sensor module comprising the magnetic sensor that is configured to detect the magnetic field of the first magnetic track and the magnetic sensor that is configured to detect the magnetic field of the third magnetic track.

8. The rotation angle detection device according to claim 7, wherein the first magnetic sensor module and the second magnetic sensor module are arranged so as to be shifted from each other in a circumferential direction of the rotating body.

\* \* \* \* \*